United States Patent [19]

Voss

[11] Patent Number: 5,559,379
[45] Date of Patent: Sep. 24, 1996

[54] INDUCTION AIR DRIVEN ALTERNATOR AND METHOD FOR CONVERTING INTAKE AIR INTO CURRENT

[75] Inventor: Mark G. Voss, Brighton, Mich.

[73] Assignee: Nartron Corporation, Reed City, Mich.

[21] Appl. No.: 136,666

[22] Filed: Oct. 14, 1993

Related U.S. Application Data

[63] Continuation-in-part of Ser. No. 12,942, Feb. 3, 1993, abandoned.

[51] Int. Cl.$^6$ ..................................... H02K 9/00
[52] U.S. Cl. ............................ 310/63; 290/54; 290/1 R; 60/397
[58] Field of Search ................ 290/1 R, 73, 54; 123/1 R; 60/605.1, 397; 310/63; 415/128, 151

[56] References Cited

U.S. PATENT DOCUMENTS

| | | | |
|---|---|---|---|
| 1,583,621 | 5/1926 | Steinberg | 60/280 |
| 2,840,343 | 6/1958 | Brandt, Jr et al. | 415/173.4 |
| 3,059,415 | 10/1962 | Birmann | 60/13 |
| 3,996,914 | 12/1976 | Crall et al. | 123/198 E |
| 4,173,203 | 11/1979 | Nakajima et al. | 123/119 A |
| 4,177,005 | 12/1979 | Bozung et al. | 415/128 |
| 4,227,372 | 10/1980 | Kakimoto et al. | 60/602 |
| 4,685,302 | 8/1987 | Abo et al. | 60/602 |
| 4,774,810 | 10/1988 | Bidwell | 60/605.1 |
| 4,827,170 | 5/1989 | Kawamura et al. | 417/407 |
| 5,394,848 | 3/1995 | Tsutsumi et al. | 123/399 |

FOREIGN PATENT DOCUMENTS

| | | |
|---|---|---|
| 0079100 | 5/1983 | European Pat. Off. . |
| 0081255 | 6/1983 | European Pat. Off. . |
| 0344902 | 12/1989 | European Pat. Off. . |
| 2748954 | 5/1979 | Germany . |
| 3205722 | 8/1983 | Germany . |
| 3313679 | 10/1984 | Germany . |
| 3641273 | 6/1987 | Germany . |
| 4104011 | 2/1992 | Germany . |
| 4212819 | 10/1992 | Germany . |
| 344128 | 3/1960 | Switzerland . |
| 595982 | 12/1947 | United Kingdom . |
| 2059515 | 4/1981 | United Kingdom . |
| 2130301 | 5/1984 | United Kingdom . |
| 92/9800 | 6/1992 | WIPO ................ 60/397 |

*Primary Examiner*—Steven L. Stephan
*Assistant Examiner*—Elvin G. Enad
*Attorney, Agent, or Firm*—C. J. Fildes & Co.

[57] ABSTRACT

An alternator assembly for use with a port fuel injected internal combustion engine including a battery charging system is driven by a turbine assembly mounted in a variable air intake or throttle valve assembly and converts the change in kinetic energy provided by the inlet combustion air movement across the turbine assembly into rotational movement which drives an electrical generating assembly or alternator to generate current which can be used to supplement a conventional vehicle battery charging system.

24 Claims, 19 Drawing Sheets

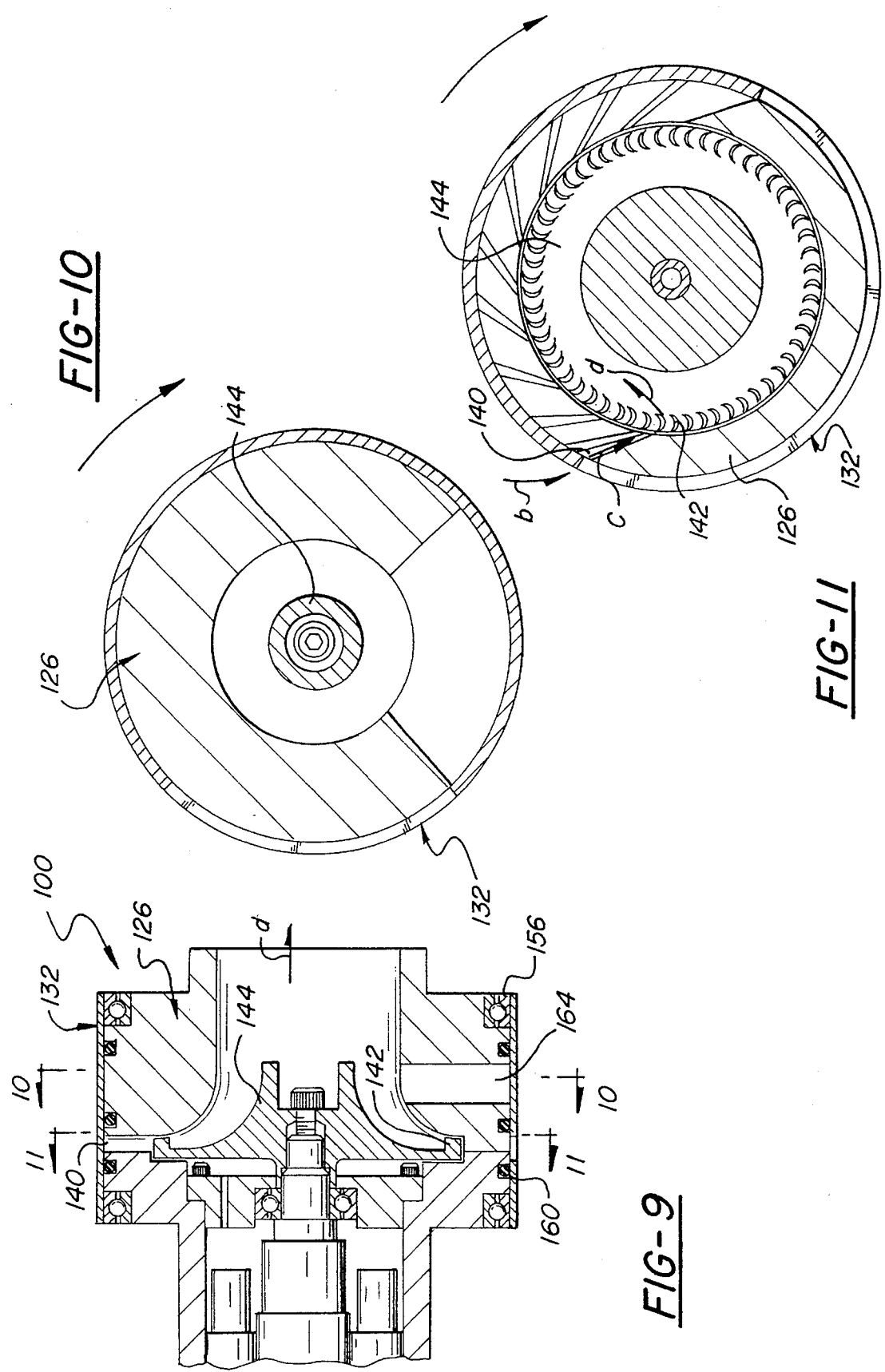

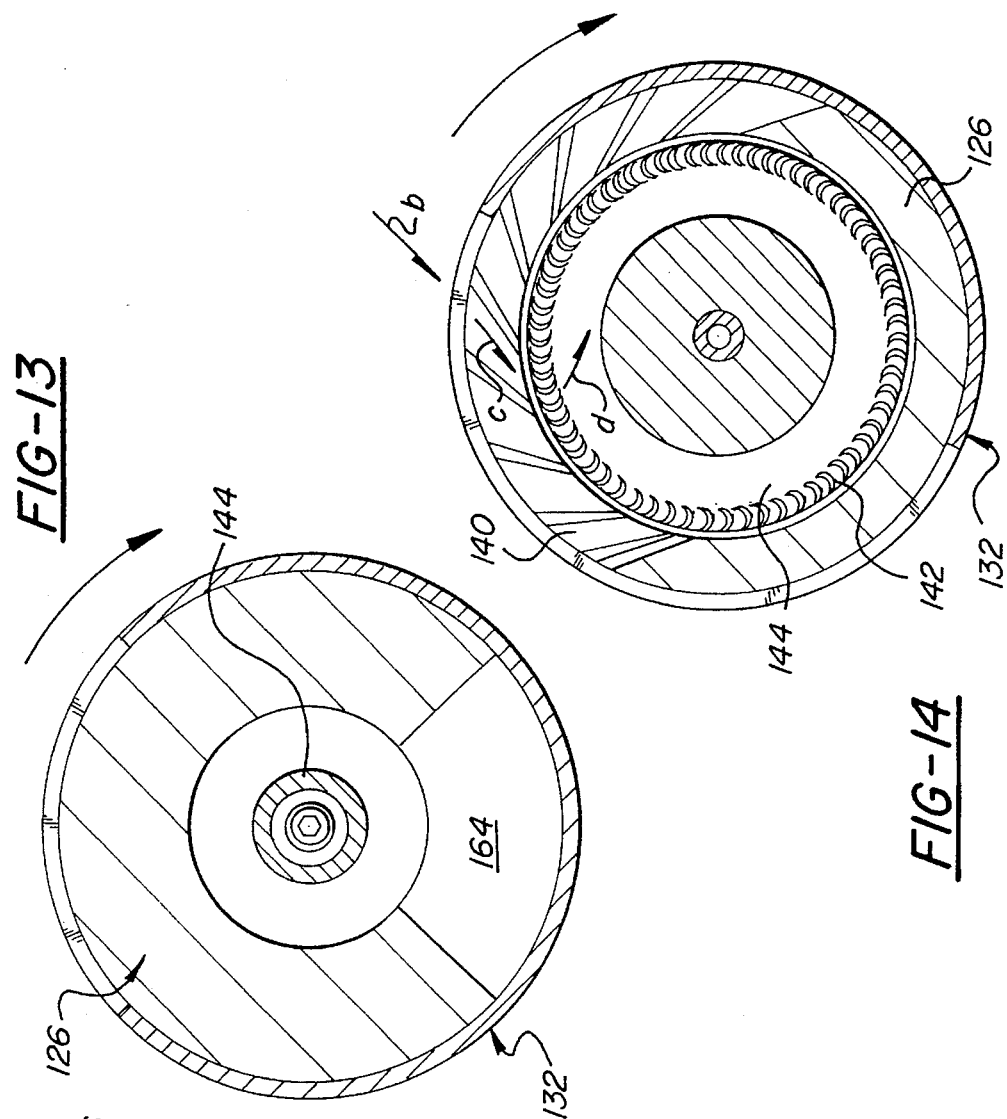
FIG-13
FIG-14
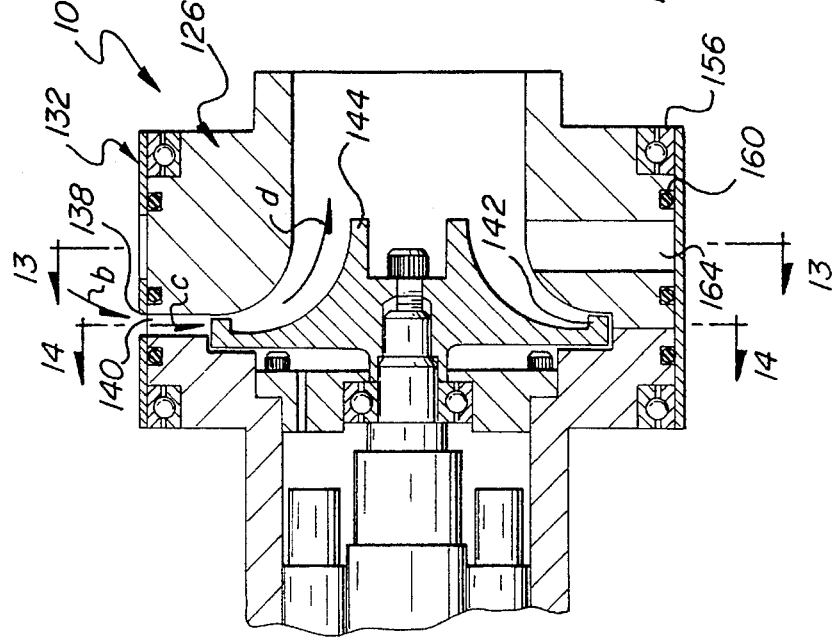
FIG-12

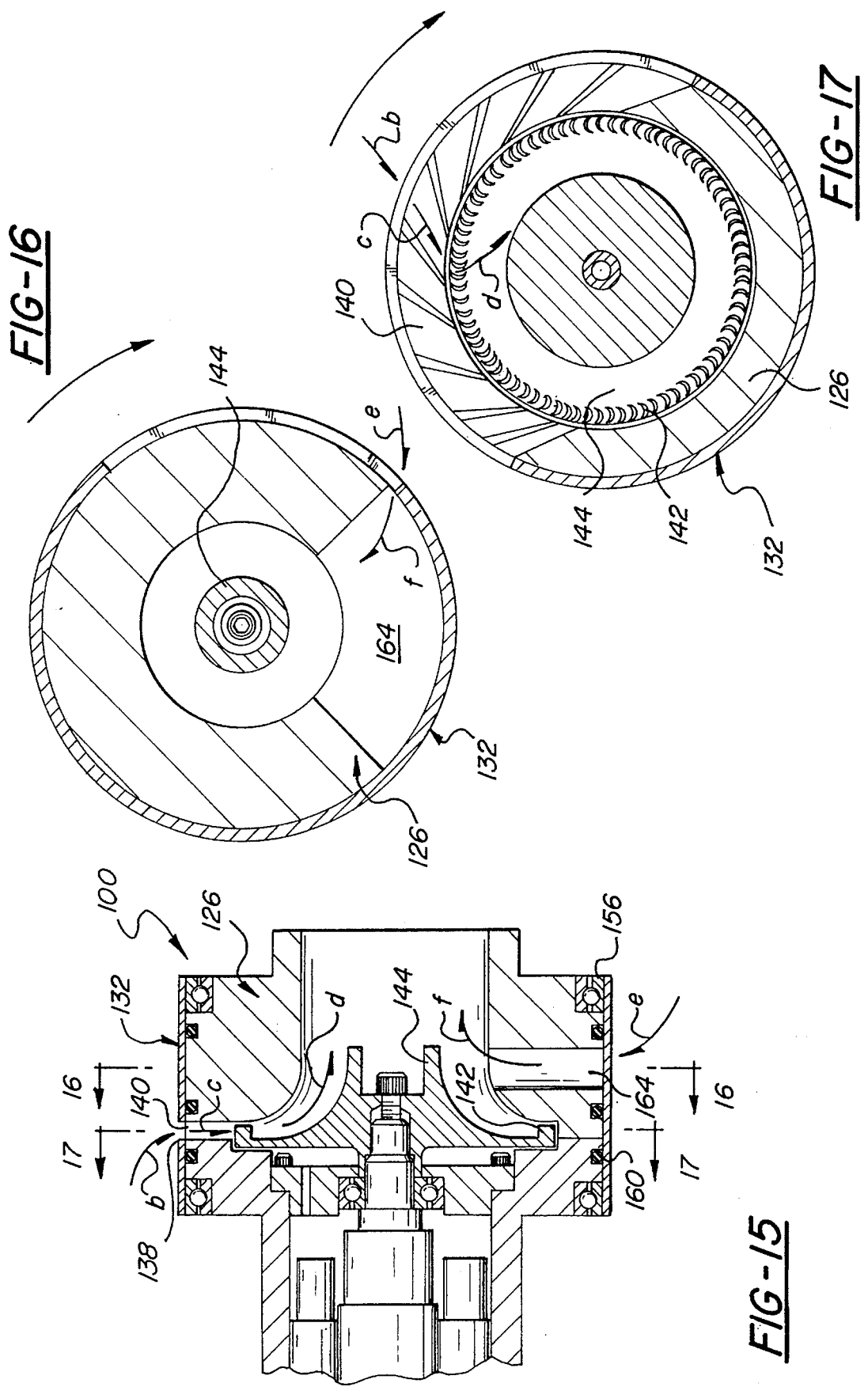

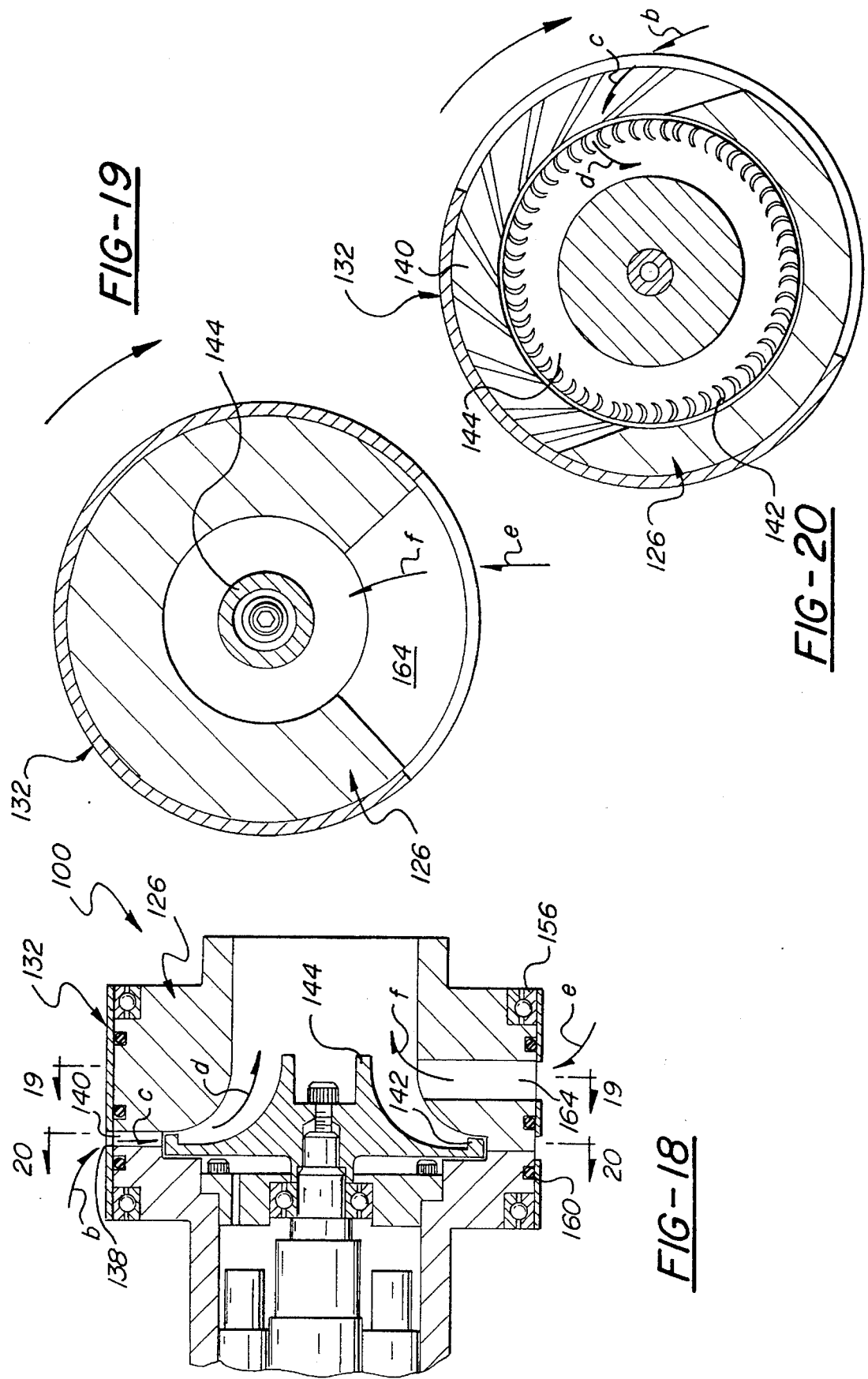

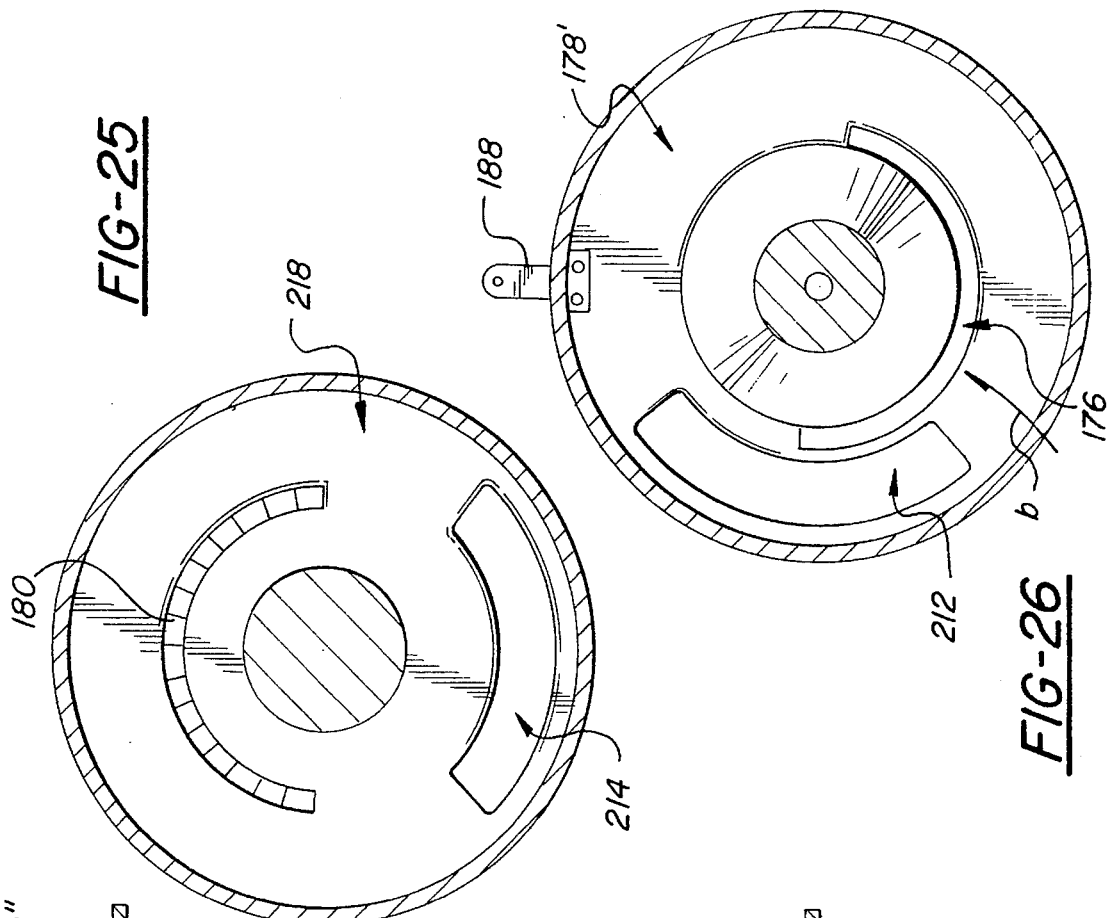
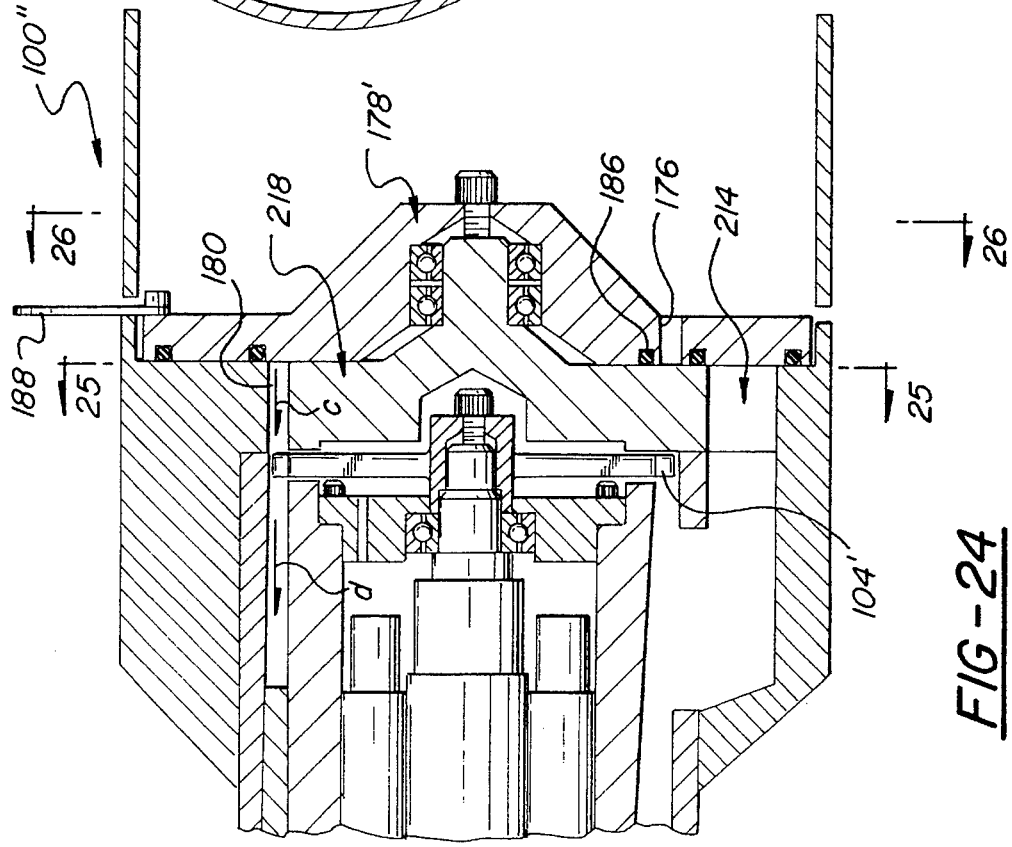
FIG-25
FIG-26
FIG-24

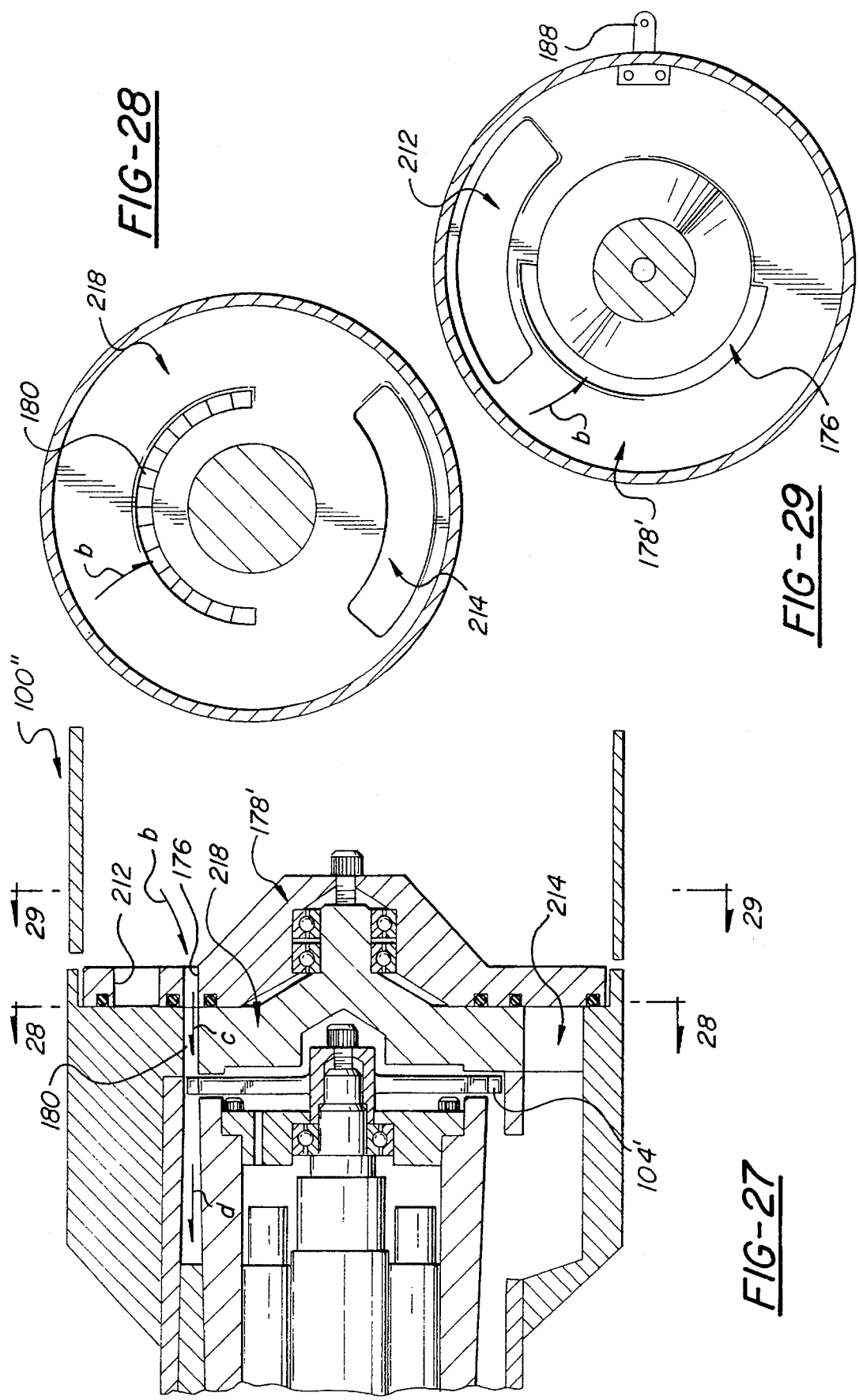

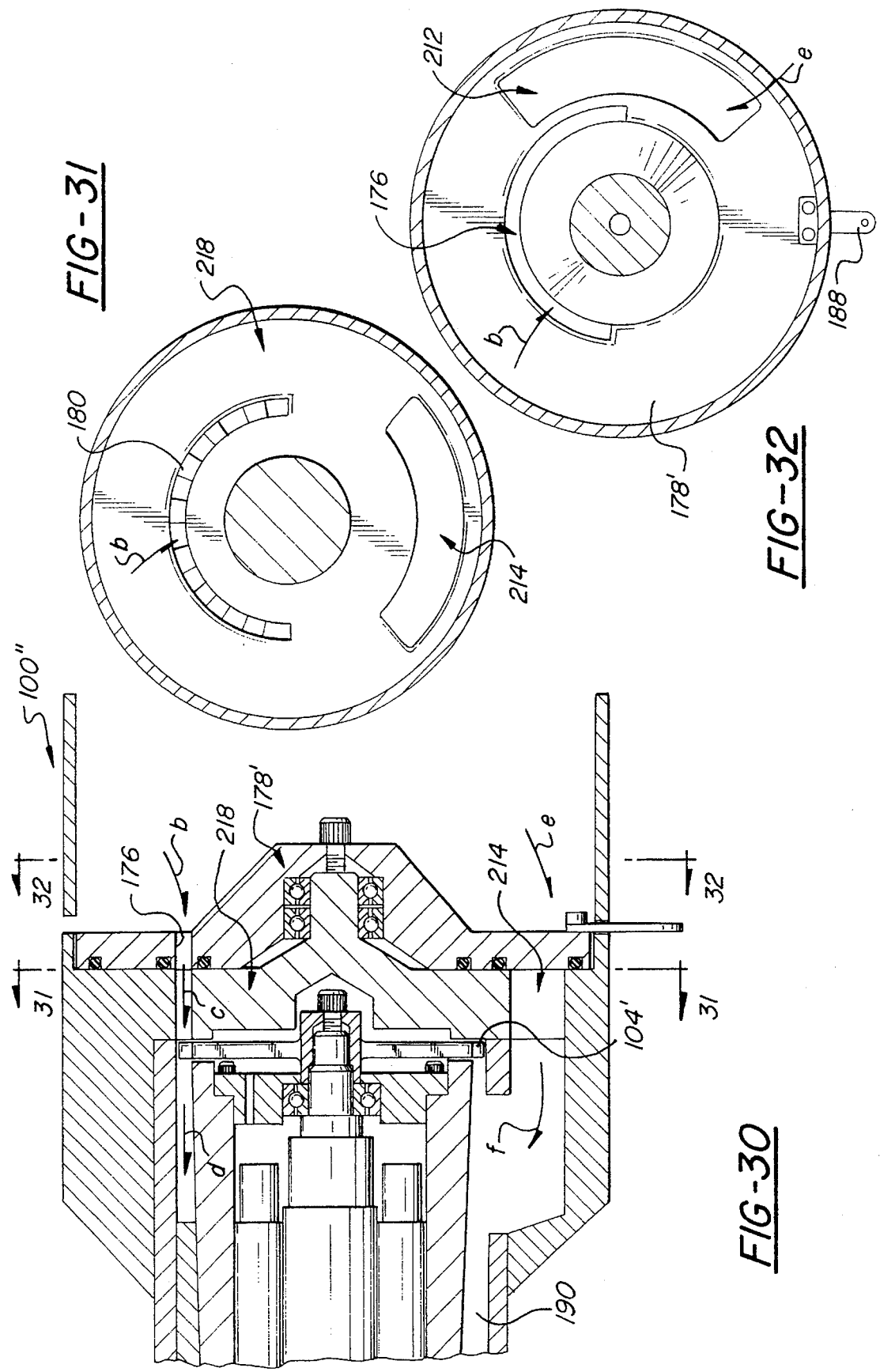

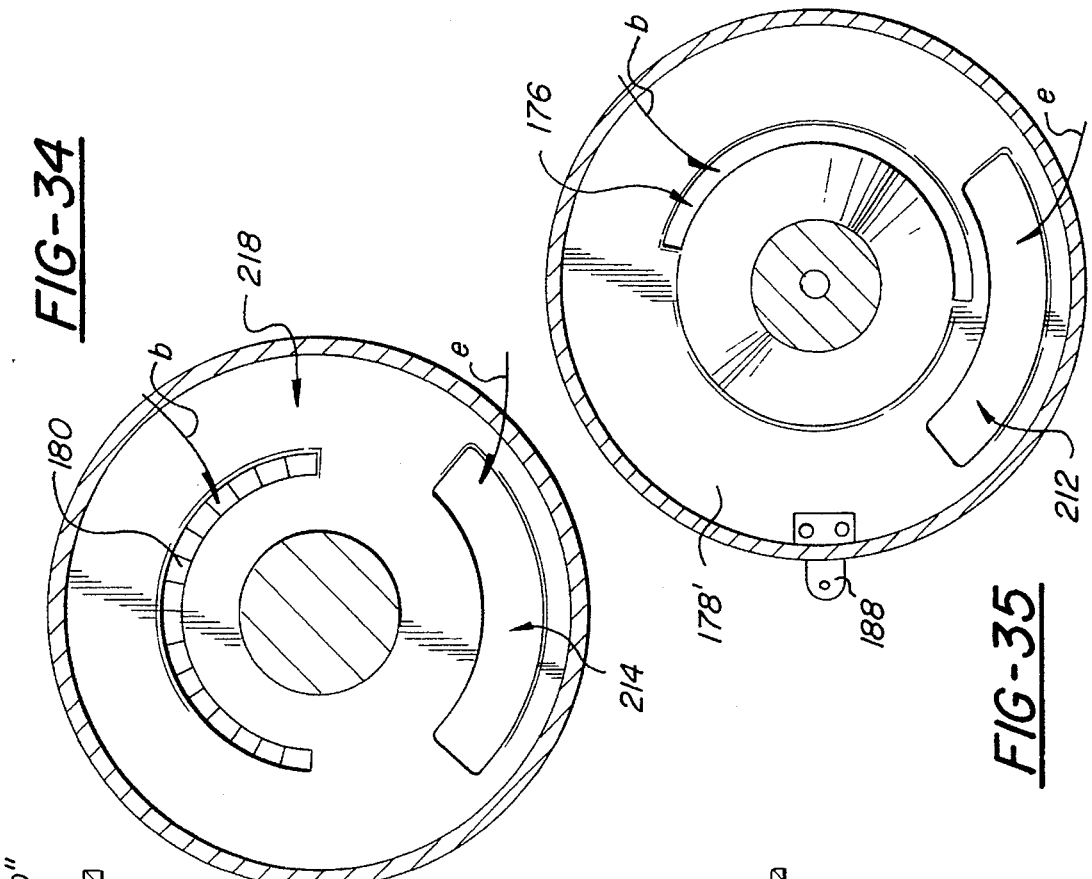
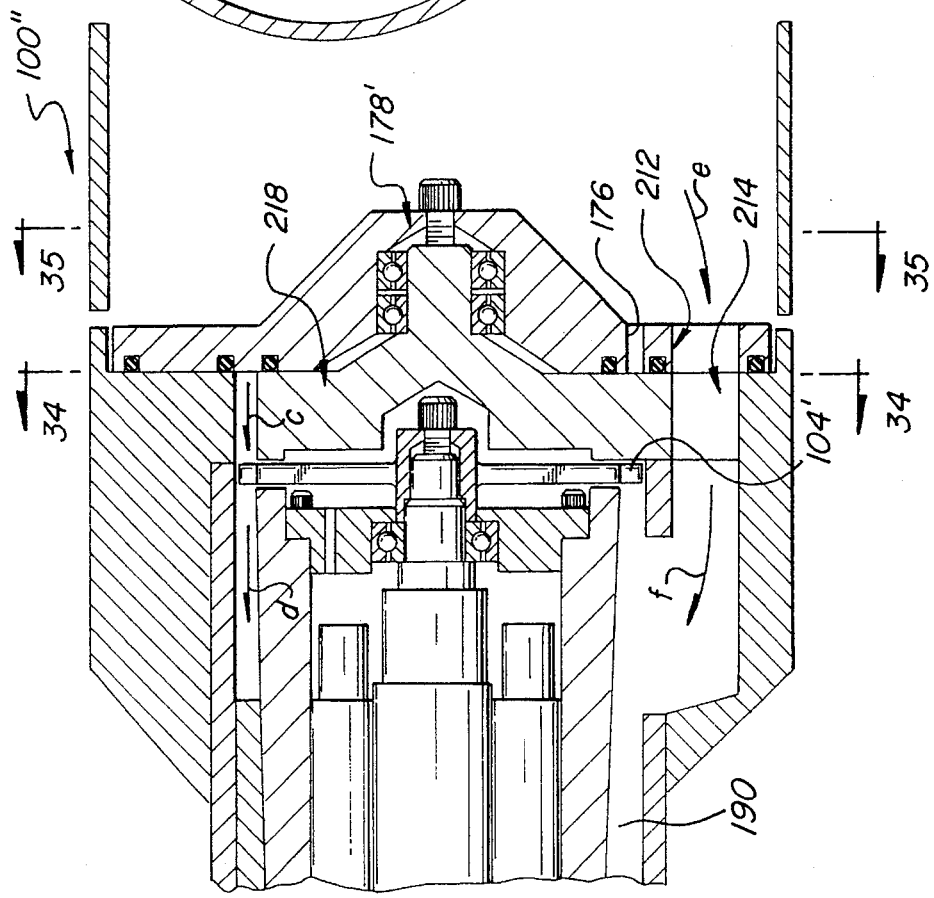

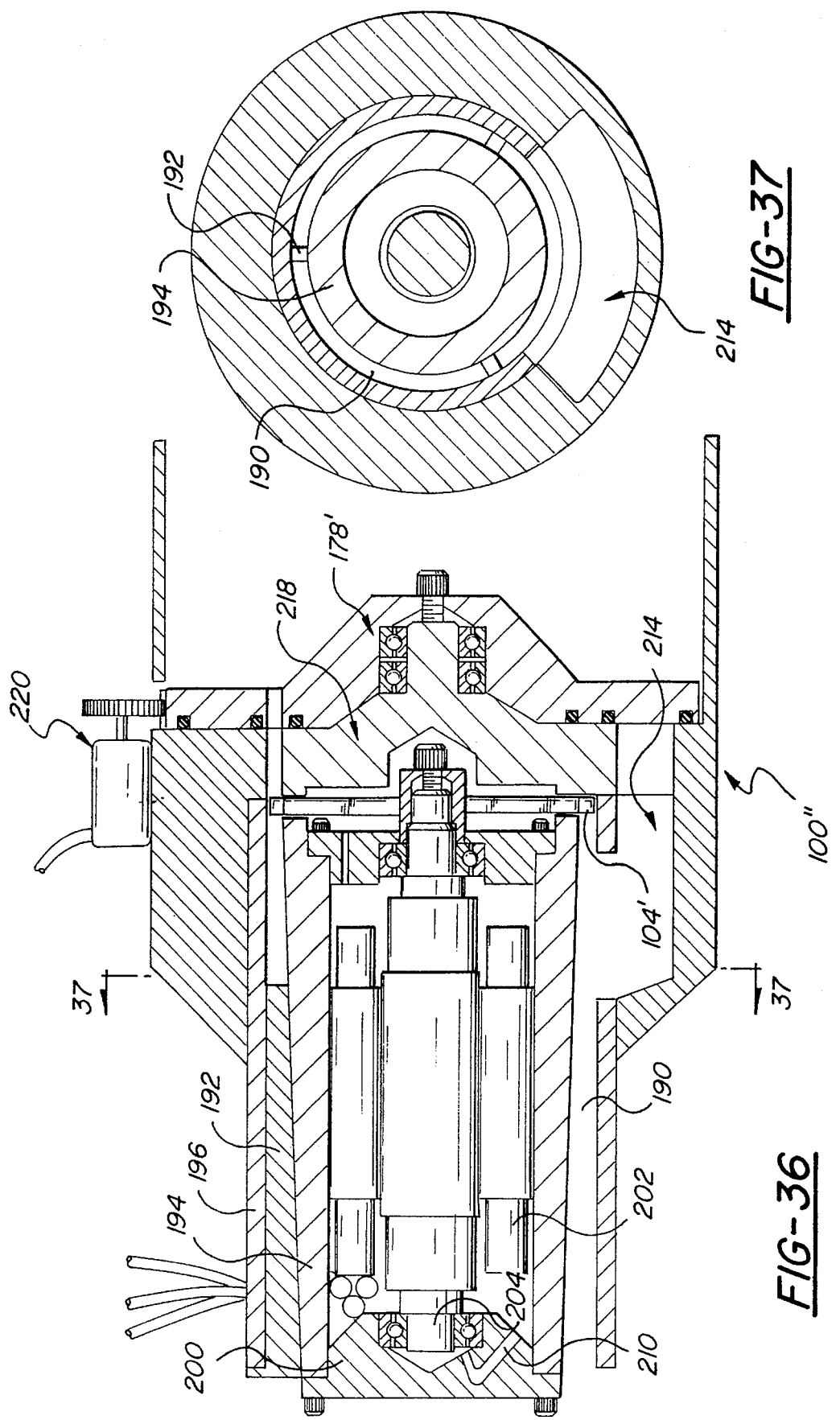

INDUCTION AIR DRIVEN ALTERNATOR AND METHOD FOR CONVERTING INTAKE AIR INTO CURRENT

CROSS-REFERENCE TO RELATED APPLICATION

This application is a continuation-in-part of U.S. patent application Ser. No. 08/012,942, now abandoned, filed Feb. 3, 1993 in the name of Mark G. Voss.

TECHNICAL FIELD

This invention relates to an energy conversion device for use with a port fuel injected internal combustion engine having an air throttle valve assembly separate from the fuel metering system and more particularly to an induction air driven alternator assembly driven by a turbine assembly mounted in the throttle valve assembly and defining the engine power control.

BACKGROUND ART

In current automobile engine design, it is necessary to meter engine inlet air in order to control engine power output. This is typically accomplished by a butterfly valve located between an inlet air filter and the engine intake manifold. During operation of the engine at idle or low power settings, the engine inlet air undergoes a significant pressure drop while crossing the butterfly valve. At the same time, air accelerates to high velocities while passing through this valve. At times, air speed is in excess of the speed of sound. This air inefficiently diffuses to a lower velocity as it dumps into the large area defined by the engine intake manifold. Significant kinetic energy is created in accelerating this flow. This energy is subsequently depleted in the turbulence which exists during the uncontrolled diffusion into the intake manifold.

Since 1973, most production automobiles have incorporated means for reintroducing a small portion of exhaust back into the engine intake manifold downstream of the combustion air intake. The primary purpose for this is to introduce an "inert" gas (the exhaust gas) into the combustion process to reduce combustion chamber peak temperatures thereby reducing the quantity of nitrous oxides in the exhaust emissions. Exhaust gas recirculation (EGR) reduces engine power due to combustion dilution and reduced inlet air density to the cylinders. Additional disadvantages include the higher susceptibility to engine detonation (knock) because of higher charge air inlet temperatures.

Other systems which have appeared in automobiles utilize shrouds wrapped around hot exhaust manifold components which serve as sources for high temperature air. These hot air supplies are traditionally used for such purposes as the prevention of carburetor ice and to improve fuel atomization in cold conditions to improve vehicle driveability. The disadvantages of this device parallel those of EGR; namely, reduced engine power and higher susceptibility to engine detonation.

DISCLOSURE OF THE INVENTION

An object of the present invention is to provide an energy conversion device in the air intake assembly of a port fuel injected internal combustion engine to recover energy in the air movement through the intake assembly.

Another object of the present invention is to provide an energy conversion device at the air inlet side of the internal combustion engine in the throttle valve assembly of a port fuel injected internal combustion engine to convert energy in the air movement through the assembly into electrical current.

A further object of the present invention is to integrate an energy conversion device in the throttle valve assembly of a port fuel injected internal combustion engine that converts energy in the air movement into electrical current and integrate the device into a vehicle battery charging system.

Another object of the present invention is to provide an energy conversion device including a turbine having a variable area turbine inlet nozzle in the air intake assembly of a port fuel injected internal combustion engine to provide an engine throttling means.

Another object of the present invention is to provide a method of utilizing energy in the air movement through the air intake assembly of a port fuel injected internal combustion engine.

Another object of the present invention is to provide a method of converting energy in the air movement through the throttle valve assembly of a port fuel injected internal combustion engine into electrical current.

Another object of the present invention is to provide a method of recovering energy from exhaust gas recirculated through an exhaust gas recirculation system into the air intake system of a port fuel injected internal combustion engine.

Another object of the present invention is to provide a method of recovering engine waste heat from exhaust manifold components into the air intake system of a port fuel injected internal combustion engine.

Another object of the present invention is to provide a method of recovering energy in recirculated exhaust gas by communicating the gas through a turbine in the air intake system of a port fuel injected internal combustion engine.

A further object of the present invention is to provide a method of recovering energy from hot exhaust manifold components by communicating heated engine intake air through a turbine in the port fuel injected internal combustion engine.

Still another object of the present invention is to provide a method of lowering engine intake air temperatures by communicating the intake air through a turbine in the air intake system of a port fuel injected internal combustion engine.

In carrying out the above objects and other objects of the invention, a turbine is mounted in the air intake assembly of a port fuel injected internal combustion engine having a throttle valve assembly separate from the fuel metering system. The turbine has a variable area air intake which defines the engine power control. The turbine converts the kinetic energy in the air movement through the air intake assembly or throttle valve assembly into rotational motion, which is used to drive an electrical alternator to generate current. The air movement through the air intake assembly created during the throttling process is expended in powering the turbine which is connected by a shaft to the alternator.

In one embodiment of the invention, the turbine is of radial design. In another, the turbine is of axial configuration. In both arrangements, the turbine includes a partial admission variable area nozzle and a moveable aperture regulator for regulating inlet air flow through the turbine.

An inlet air bypass for bypassing the turbine from inlet air can be integrated into either embodiment of the invention or mounted on the engine air intake assembly or intake manifold in a parallel relationship to the turbine. The bypass can be controlled by the position of the nozzle aperture or independently thereof.

A method for converting kinetic and potential energy of combustion air communicated through a variable combustion air intake of a port fuel injected internal combustion engine into electrical energy, includes the steps of: interposing a turbine in the combustion air intake; communicating the combustion air through the turbine; converting the air movement through the turbine into rotational motion; communicating the turbine rotational motion to an electrical current generating assembly and generating electrical current.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 9 is a sectional side elevational view of the radial inflow induction air driven alternator assembly of FIG. 5 illustrating a radial gap alternator therein and having the combined inlet and bypass air control valve of one piece construction and illustrated in a partially open nozzle aperture and bypass fully closed as in an engine idle condition;

FIG. 10 is a sectional front elevational view of a turbine nozzle bypass port of the radial inflow induction air driven alternator assembly of FIG. 9;

FIG. 11 is a sectional front elevational view of the turbine nozzle of FIG. 9 illustrating the turbine nozzle and turbine blade;

FIG. 12 is a sectional side elevational view of the radial inflow induction air driven alternator assembly of FIG. 9 wherein the inlet and bypass air control valve has been rotated 90° and illustrating in a 50% open nozzle aperture and bypass fully closed condition;

FIG. 13 is a sectional front elevational view of the turbine nozzle bypass port of FIG. 12;

FIG. 14 is a sectional front elevational view of the turbine nozzle of FIG. 12 illustrating the turbine nozzle and turbine blade;

FIG. 15 is a sectional side elevational view of the radial inflow induction air driven alternator assembly of FIG. 9 wherein the inlet and bypass air control valve has been rotated 180° from its idle position and illustrating a full nozzle aperture and bypass just beginning to open condition;

FIG. 16 is a sectional front elevational view of the turbine nozzle bypass port of FIG. 15;

FIG. 17 is a sectional front elevational view of the turbine nozzle of FIG. 15 illustrating the turbine nozzle and turbine blade;

FIG. 18 is a sectional side elevational view of the radial inflow induction air driven alternator assembly of FIG. 9 wherein the inlet and bypass air control valve has been rotated 270° from its idle position and illustrating a 50% open nozzle aperture and bypass fully open as in an engine full throttle condition;

FIG. 19 is a sectional front elevational view of the turbine nozzle bypass port of FIG. 18;

FIG. 20 is a sectional front elevational view of the turbine nozzle of FIG. 18 illustrating the turbine nozzle and turbine blade;

FIG. 24 is a sectional side elevational view of an axial inflow induction air driven alternator assembly including an integral bypass for bypassing the turbine and having a combined inlet and bypass air regulator defined by a moveable aperture control disc illustrating a partially open nozzle aperture and bypass fully closed as in an engine idle condition;

FIG. 25 is a sectional front elevational view of the turbine nozzle entrance plane of the axial induction air driven alternator assembly of FIG. 24;

FIG. 26 is a sectional front elevational view of a plane just upstream of an aperture plate in the axial inflow induction air driven alternator assembly of FIG. 24;

FIG. 27 is a sectional side elevational view of the axial inflow induction air driven alternator assembly of FIG. 24 illustrating a 50% open nozzle aperture and bypass fully closed condition;

FIG. 28 is a sectional front elevational view of the turbine nozzle entrance plane of the axial induction air driven alternator assembly of FIG. 27;

FIG. 29 is a sectional front elevational view of the plane just upstream of the aperture plate in the axial inflow induction air driven alternator assembly of FIG. 27;

FIG. 30 is a sectional side elevational view of the axial inflow induction air driven alternator assembly of FIG. 24 illustrating a fully open nozzle aperture and bypass beginning to open condition;

FIG. 31 is a sectional front elevational view of the turbine nozzle entrance plane of the axial inflow induction air driven alternator assembly of FIG. 30;

FIG. 32 is a sectional front elevational view of the plane just upstream of the aperture plate in the axial inflow induction air driven alternator assembly of FIG. 30;

FIG. 33 is a sectional side elevational view of the axial inflow induction air driven alternator assembly of FIG. 24 illustrating a 50% open nozzle aperture and bypass fully open as in an engine full throttle condition;

FIG. 34 is a sectional front elevational view of the turbine nozzle entrance plane of the axial inflow induction air driven alternator assembly of FIG. 33;

FIG. 35 is a sectional front elevational view of the plane just upstream of the aperture plate in the axial inflow induction air driven alternator assembly of FIG. 33;

FIG. 36 is a sectional side elevational view of the axial inflow induction air driven alternator assembly of FIG. 24 illustrated with an electro-mechanical stepper motor drive for operating the integral inlet and bypass air control disc;

FIG. 37 is another sectional front elevational view of the axial inflow induction air driven alternator assembly of FIG. 24 illustrating the air flow path through the outer housing;

BEST MODE FOR CARRYING OUT THE INVENTION

Referring to FIGS. 1 through 4a, an induction air driven alternator assembly 100,100',100",100''' is described for use with a modern port fuel injected internal combustion engine 102. The alternator assembly 100,100',100",100''' replaces a conventional variable air intake or throttle body and defines the engine 102 power control. As is hereinafter more fully described, the induction air driven alternator assembly 100, 100',100",100''' includes and is driven by a turbine assembly 104,104' of radial or axial design interposed in the engine air intake. The turbine assembly 104,104' converts the change in kinetic energy in the air flow across the engine power control into rotational motion which drives an electrical current generator 106 or alternator to produce electrical current. This current is used to supplement a conventional vehicle charging system as is more fully herein described.

Figure 1:
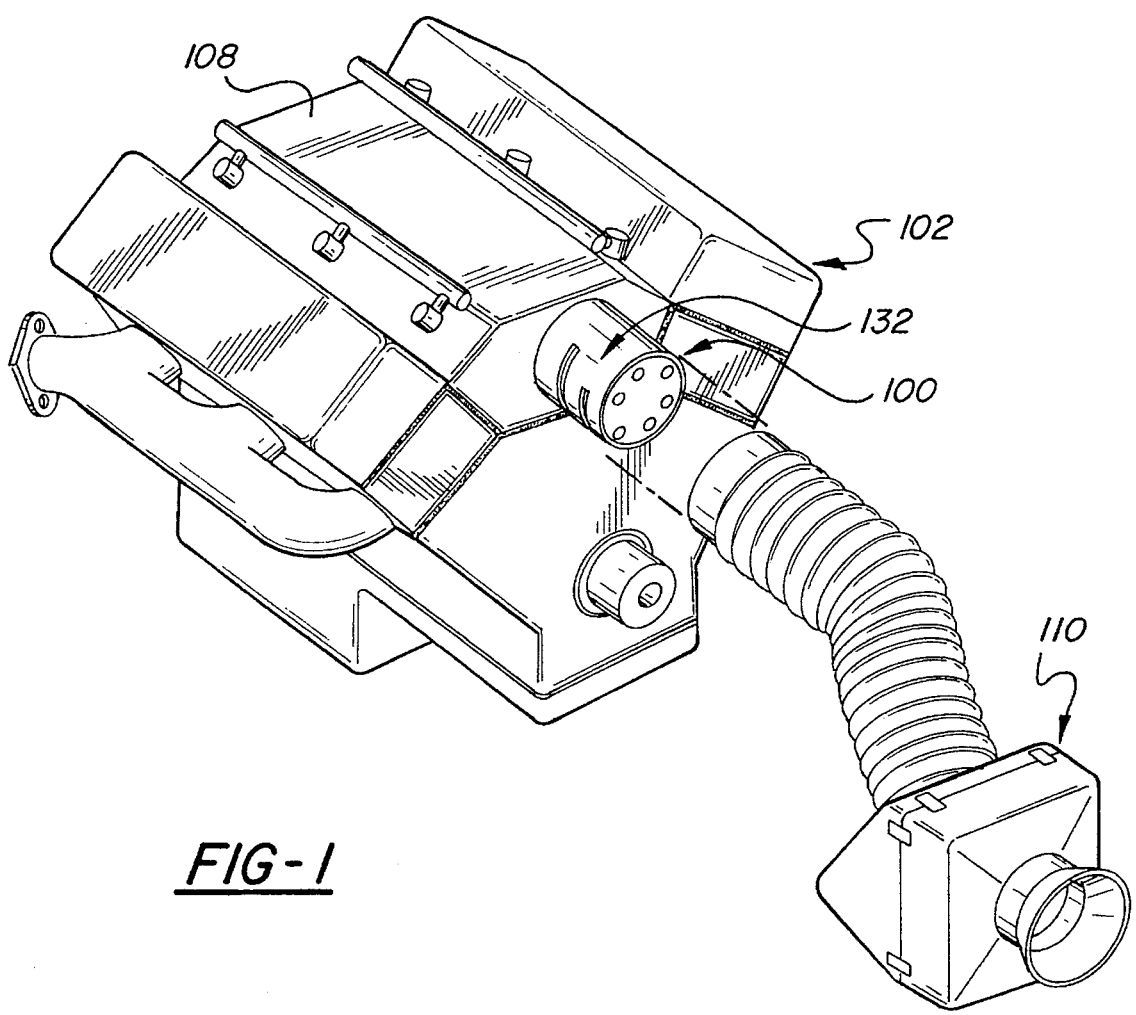
FIG. 1 is a perspective environmental view of a port fuel injected V6 engine having a radial type induction air driven alternator assembly constructed in accordance with the present invention mounted thereon.

As illustrated in FIG. 1, the modern port fuel injected V6 engine 102 includes an intake manifold 108 in communication with an air filter and enclosure assembly 110 through which inlet or combustion air is communicated into the engine. Interspread between the intake manifold 108 and air filter assembly 110 is the induction air driven alternator assembly 100. Assembly 100 includes a turbine assembly 104 of radial design illustrated in FIGS. 6 and 9–21.

Figure 2:
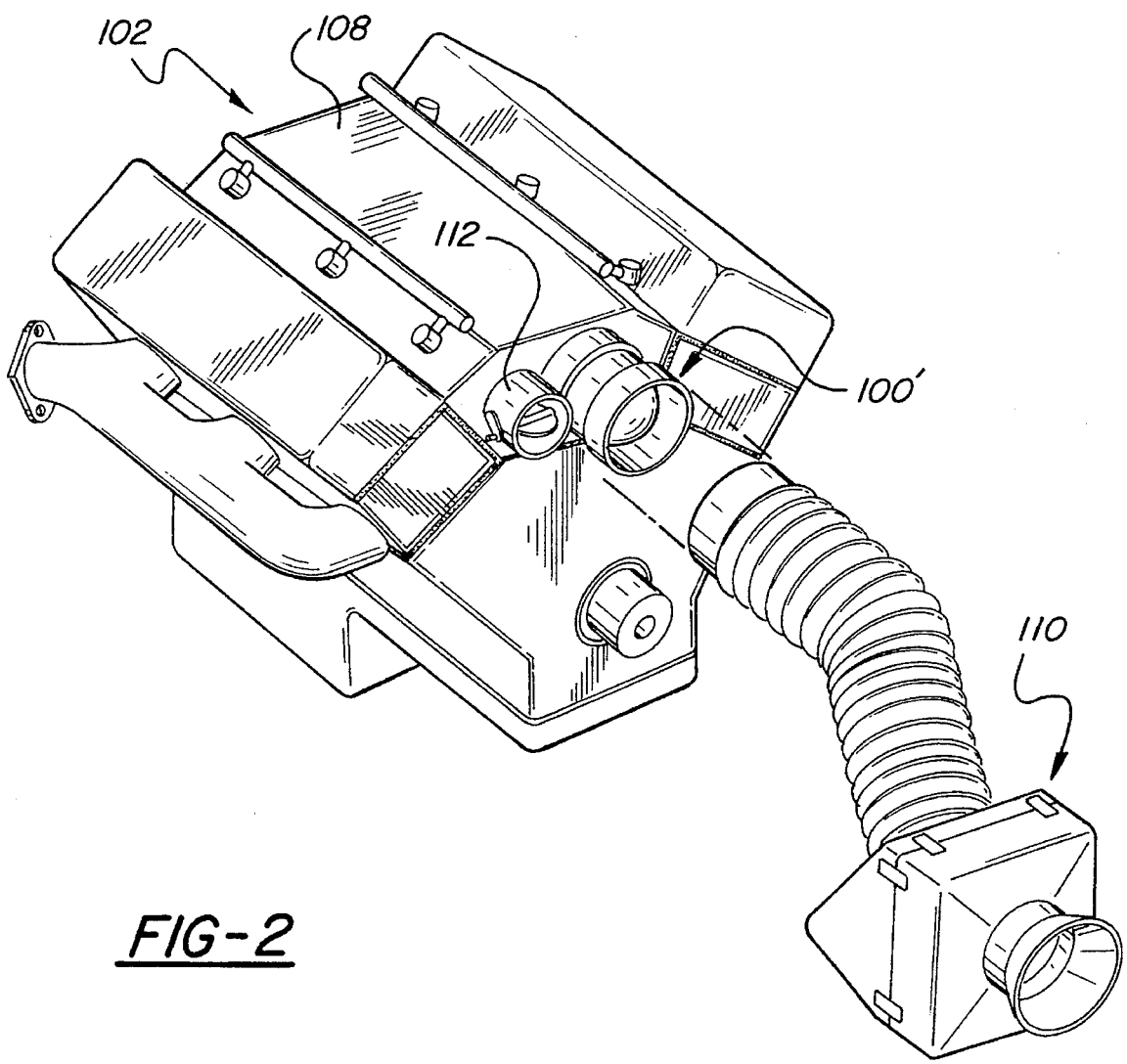
FIG. 2 is a perspective environmental view of a port fuel injected V6 engine having an axial type induction air driven alternator assembly constructed in accordance with the present invention mounted thereon.

In FIG. 2, the modern port fuel injected V6 engine 102 includes an alternative induction air driven alternator assembly 100',100",100'''. Alternator assembly 100',100",100''' includes a turbine assembly 104' of axial design. Like the alternator assembly 100 of FIG. 1, alternator assembly 100',100",100''' is mounted on an intake manifold 108. In the configuration illustrated in FIG. 2, an independent bypass valve 112 of butterfly construction is also mounted on intake manifold 108 and independently communicates combustion air into engine 102. Bypass valve 112 functions in a parallel relationship with alternator assembly 100',100''' and is used when the alternator assembly 100,100" includes no independent bypass means for bypassing the turbine assembly 104,104' from inlet air. Bypass valve 112 can be controlled by the alternator assembly 100',100''' through linkages or alternatively it can be independently controlled.

Figure 3:
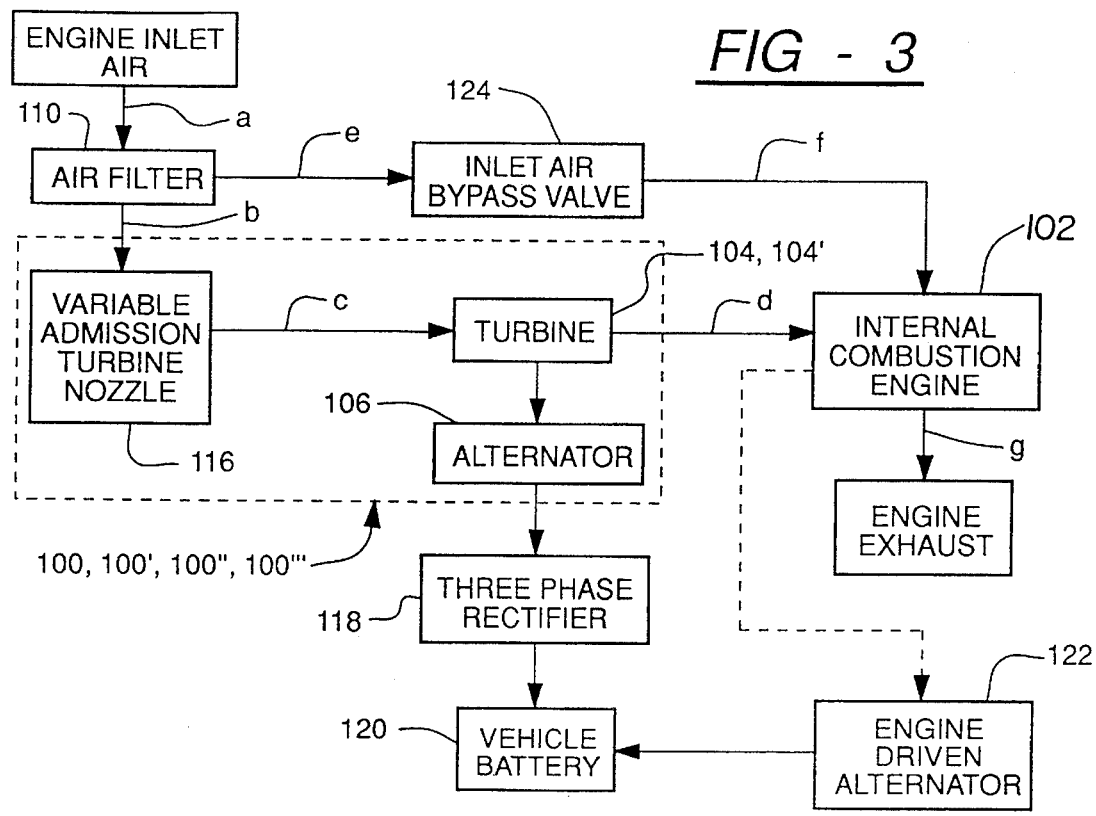
FIG. 3 is a block diagram schematically illustrating the combination of an induction air driven alternator assembly with a port fuel injected engine in a vehicle battery charging system.

The block diagram of FIG. 3 illustrates schematically the combination of either of the induction air driven alternator assemblies 100,100" into a typical pore fuel injected engine vehicle battery charging system.

Figure 4A:
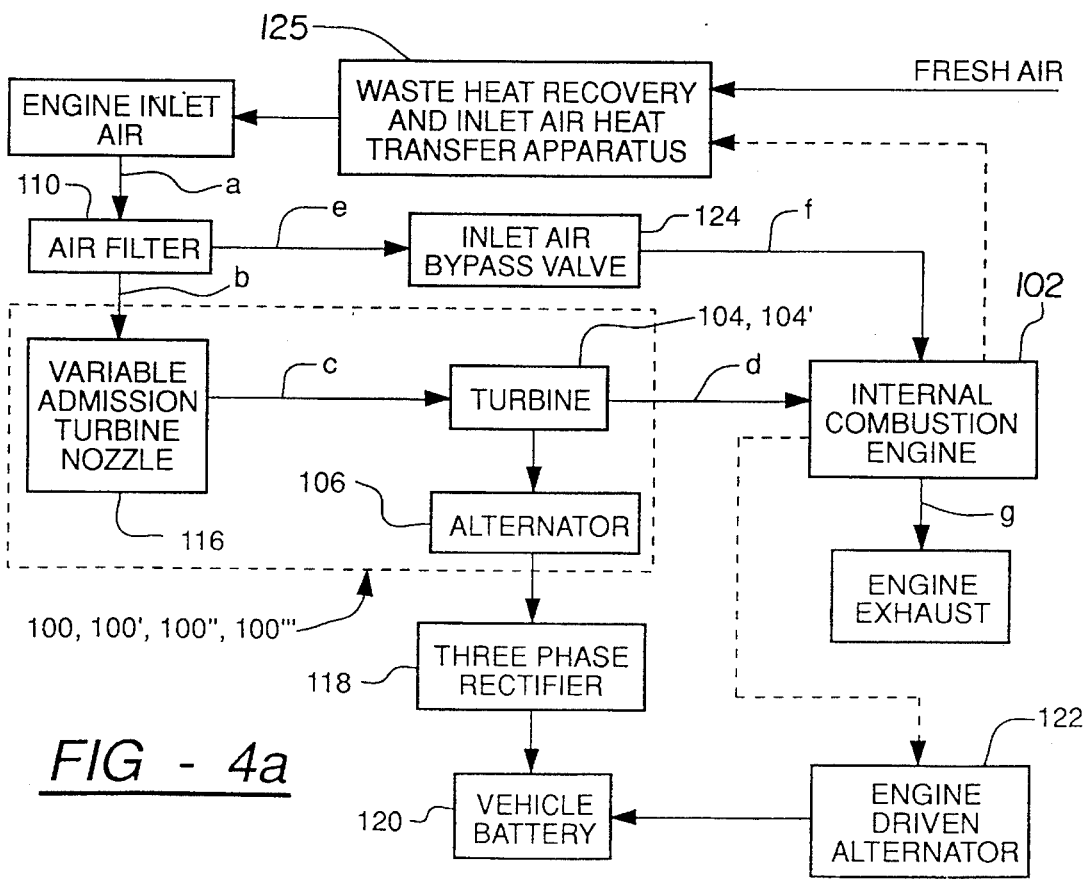
FIG. 4a is a block diagram schematically illustrating the combination of an induction air driven alternator assembly with a port fuel injected engine, having exhaust gas recirculation in a vehicle battery charging system.
Figure 4:
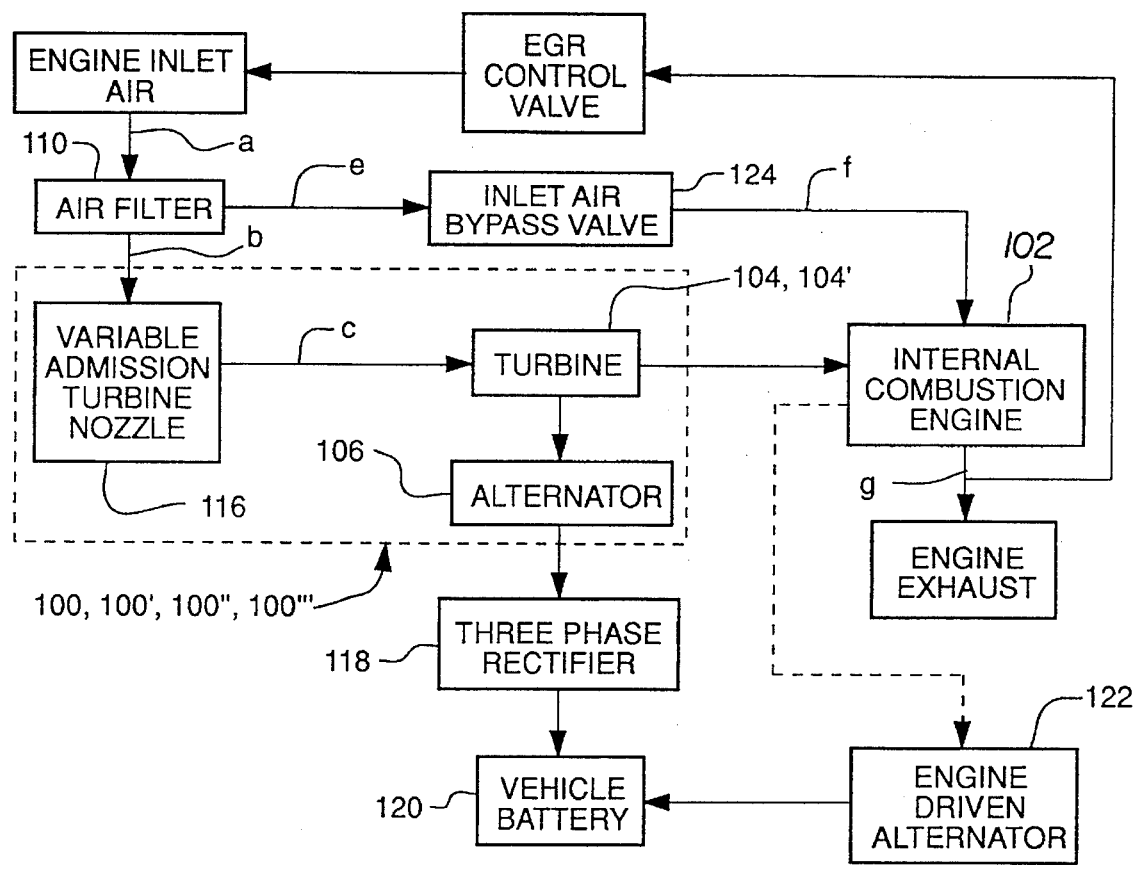
FIG. 4 is a block diagram schematically illustrating the combination of an induction air driven alternator assembly with a port fuel injected engine, utilizing heat exchange devices to recover waste heat from various components such as a muffler, catylitic converter or exhaust manifold, in a vehicle battery charging system.

With continued reference to FIGS. 3 & 4, ambient inlet air represented by flow a passes through air filter assembly 110 and exits as flow b. Flow b then enters the induction air alternator assembly 100,100" and passes through a combination valve and turning/acceleration nozzle, or variable admission turbine nozzle 116, before entering the turbine assembly 104,104' as flow c. Flow c comprises air flowing at a high, directed velocity. Flow c enters the turbine assembly 104,104' and is turned to a roughly axial direction. The turbine exit flow d leaves the turbine assembly 104,104' and the induction air alternator assembly 100,100" proper and enters the intake manifold 108 of the internal combustion engine 102. The momentum of the high velocity air c is converted by the turbine assembly 104,104' into rotational motion which is communicated to the electrical current generator or alternator 106 by a shaft.

Alternating electrical current exiting the alternator assembly 100,100' enters a three phase rectifier 118 where the alternating current is converted to direct current. The direct current exiting the three phase rectifier 118 is directed to the vehicle battery 120 for the purpose of charging the battery and also for powering other ancillary systems within a vehicle. Exhaust gas flow 122 from the internal combustion engine 102 leaves as flow g. A conventional belt driven alternator 122 also serves to maintain a charge on the battery 120 and to power various ancillary vehicle systems.

An alternative path around the variable admission turbine nozzle 116 and turbine assembly 104 is provided for periods of engine operation wherein minimum inlet air restriction is desired such as at full engine output power. This alternative path, is regulated by a bypass valve 124. Filtered engine inlet air e is directed into valve 124 and exits as flow f where it enters the engine 102 downstream of the turbine assembly 104,104'. The bypass valve 124 may be independent or integral with bypass valve 112 of FIG. 2 as hereinafter described. Three phase rectifier 118 may also be either independent or integral with the induction air alternator assembly 100,100',100",100"' as hereinafter more fully described.

In the block diagram of FIG. 4a, a heat exchange device 125 has been added to the charging system to recover engine heat from a variety of sources including oil, coolant and exhaust and to introduce this heat flux to the engine inlet air in whole or in part. This hot air serves to increase the power output of the induction air alternator assembly 100,100', 100",100"'.

Figure 7:
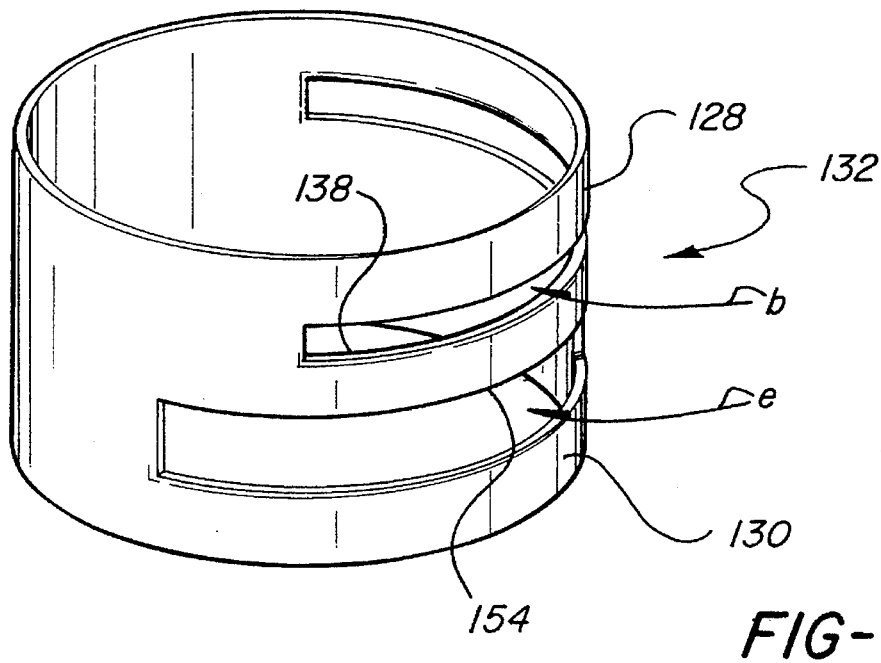
FIG. 7 is a perspective view of a combined inlet and bypass air regulator defined by a control valve of one piece construction for use with the radial inflow induction air driven alternator assembly.
Figure 8:
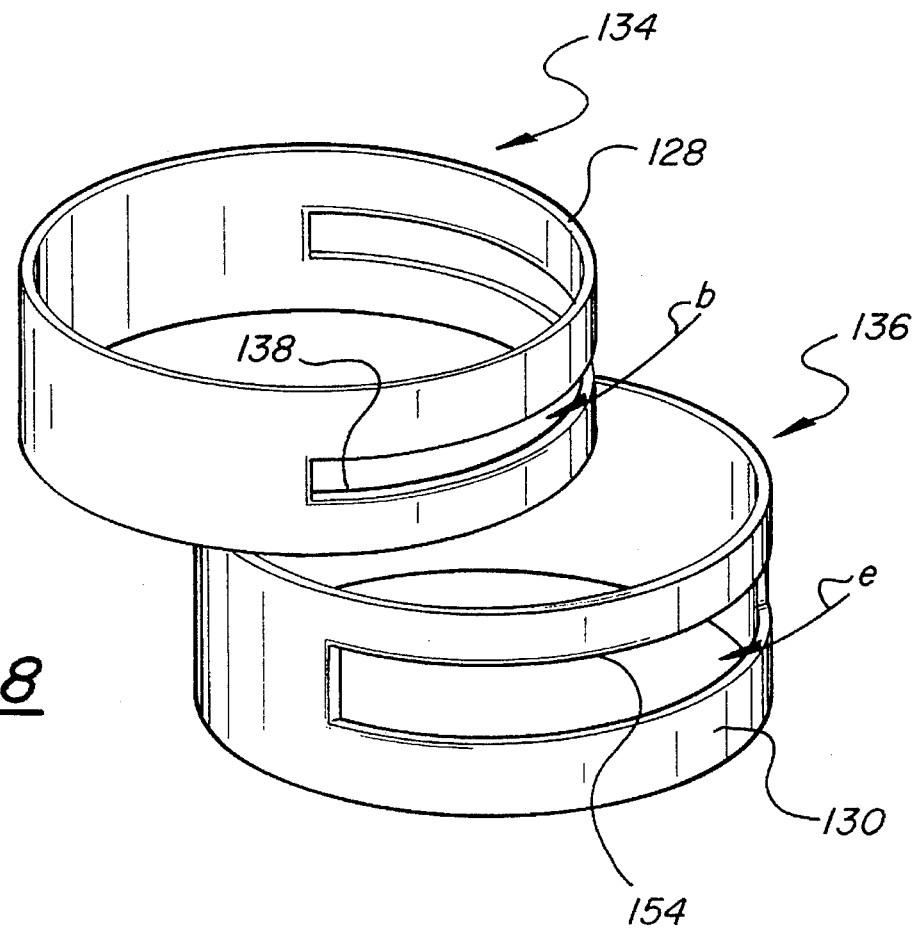
FIG. 8 is a perspective view of independent inlet air and bypass air regulators defined by separate control valves for use with the radial inflow induction air driven alternator assembly.

With further reference to FIG. 1 and with reference to FIG. 5 through 20, the induction air driven alternator assembly 100 illustrated includes a turbine assembly 104 of a radial construction and is shown in greater detail mounted in housing 126. The turbine assembly 104 of alternator assembly 100 includes a controllable turbine inlet or control valve 128 defined by a rotatable valve. Turbine assembly 104 also includes a bypass or control valve 130 defined by a rotatable valve. In the embodiment of alternator 100 illustrated, the inlet and bypass air control valves are combined on one combined turbine inlet and bypass control valve 132 of one piece construction and shown in FIG. 7. Alternatively, the turbine inlet air control 128 and bypass air control valve 130 are defined by individual valves as illustrated in FIG. 8. Inlet air flows are illustrated by arrows b and c.

Figure 6:
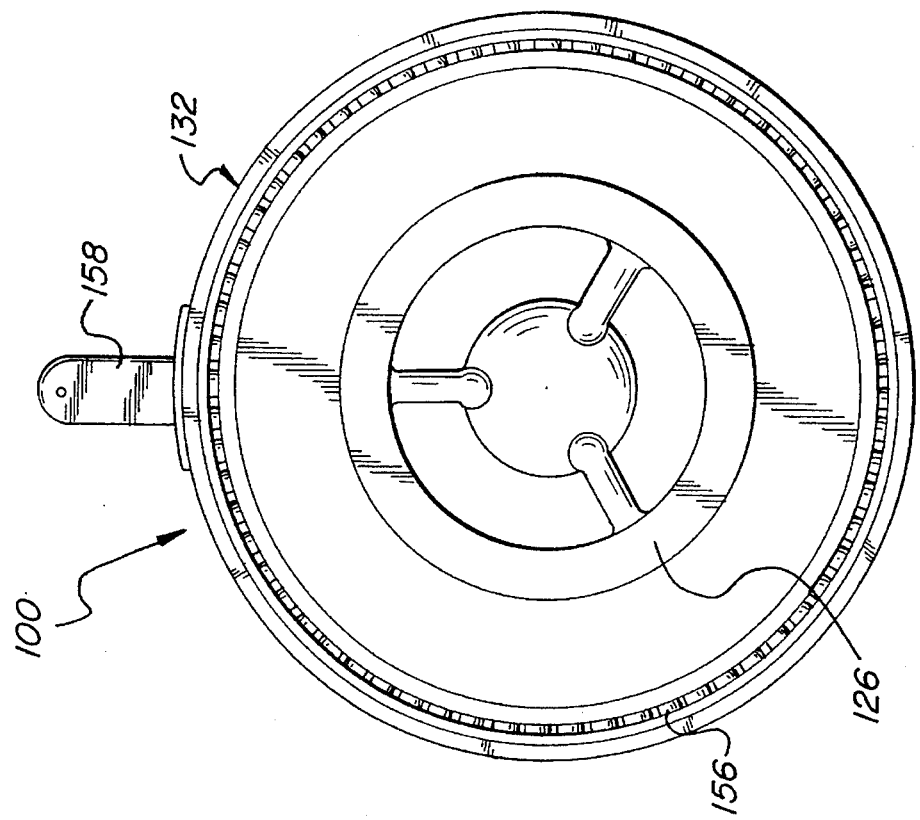
FIG. 6 is a front elevational view of the radial turbine of FIG. 5.
Figure 5:
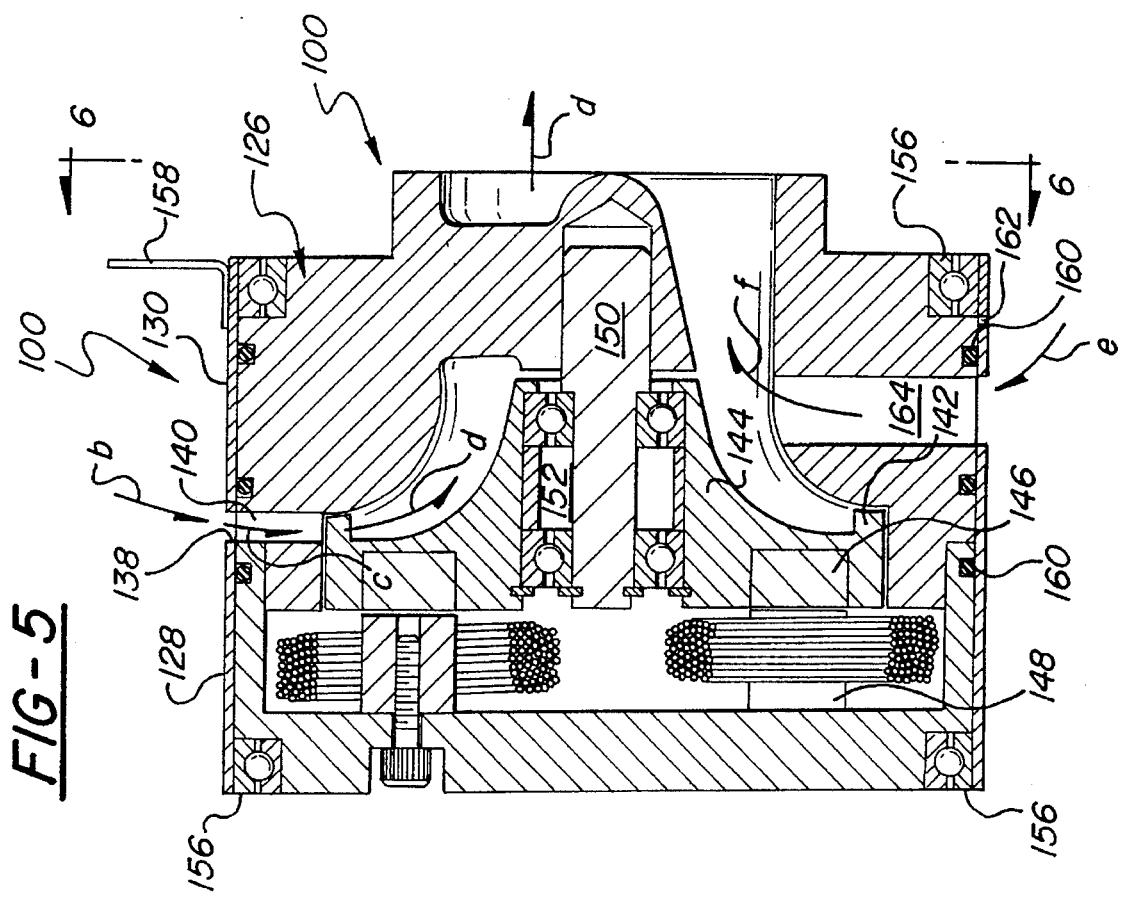
FIG. 5 is a sectional side elevational view of a radial inflow induction air driven alternator assembly constructed in accordance with one embodiment of the invention and illustrating an axial gap alternator therein.

With reference to FIGS. 5 and 6, the alternator assembly 100 includes a radial turbine driving an axial gap type alternator. Turbine inlet air b is communicated through the aperture 138 in the turbine inlet control valve 128 through the turbine nozzle 140 and impinges the turbine blades 142 which are supported by turbine disc 144. Induction air d exits the turbine blade row and exits the induction air alternator assembly 100. The turbine disc 144 also provides the structural support for alternator magnets 146. The number of alternator magnets 146 are selected in accordance with the desired frequency range of the output alternating frequency of the unit. Stator 148 contains the requisite backiron, insulation and wire coils necessary for the generation of electrical current. The turbine disc 144 is supported and located by a stationary shaft 150 mounted in housing 126 and a bearing package 152.

Turbine bypass air e flows through the aperture 154 in the turbine bypass air control valve 132 and enters the turbine bypass channel 164 as flow f before merging with the turbine discharge air d and exiting the assembly 100.

Bypass air control valve 132 is supported by torque-tube type bearings 156 and is concentrically mounted around housing 126. Valve 132 is therefore rotatable relative to the housing 126. In the case of the two-piece construction, control valves 128 and 130 are independently rotatable relative to each other. Bypass air control input for valve 132 is provided by lever 158 which can be connected to a mechanical or electro-mechanical controller, hereinafter described. The clearances between the bypass air control valve 132 and the housing 126 are sealed by O-rings 160. Bleed holes 162 are provided in the bypass air control valve 132 inboard of the valve support bearings 156 to eliminate any pressure differential across the valve support bearings which would cause grease to migrate from the bearings.

The operation of alternator 100 is illustrated in FIG. 9 through 20 through four selected operational positions of the bypass air control valve 132.

With reference to FIGS. 9–11, alternator assembly 100 includes a radial turbine driving a radial gap type alternator. Therein, the assembly is shown in an engine idle condition wherein the bypass port 164 is blocked and only turbine nozzle 140 is open for flow. Turbine nozzle 140 which communicates combustion air into the intake manifold 108 has been sized to meet the idle airflow requirements of engine 102. Flow through the alternator 100 is illustrated by arrows wherein inlet air is referenced b, nozzle passageway air c and discharge air d.

FIGS. 12–14 illustrate alternator 100 in a partially open throttle condition wherein the combined inlet and bypass air control valve 132 has been rotated in a clockwise direction 90° from the idle position shown in FIG. 9. In this position, the turbine inlet aperture 138 is at a part-throttle position, the bypass port 164 is occluded and about 50% of the total turbine nozzle 140 is open for flow.

In FIGS. 15–17, bypass air control valve 132 has been rotated clockwise 180° from the idle position as shown in FIG. 9. In this position, the turbine inlet aperture 138 is at full nozzle aperture and the bypass port 164 is just beginning to be exposed. Additional inlet air then begins to enter alternator 100 through the bypass aperture 154 into bypass port 164 and is illustrated as flows e and f.

FIGS. 18–20 illustrate a full throttle condition wherein the bypass air control valve 132 has been rotated clockwise 270° from the idle position shown in FIG. 9. In this position, the turbine inlet aperture 138 is about 50% open and the bypass port 164 in FIG. 9 is fully open.

Figure 21:
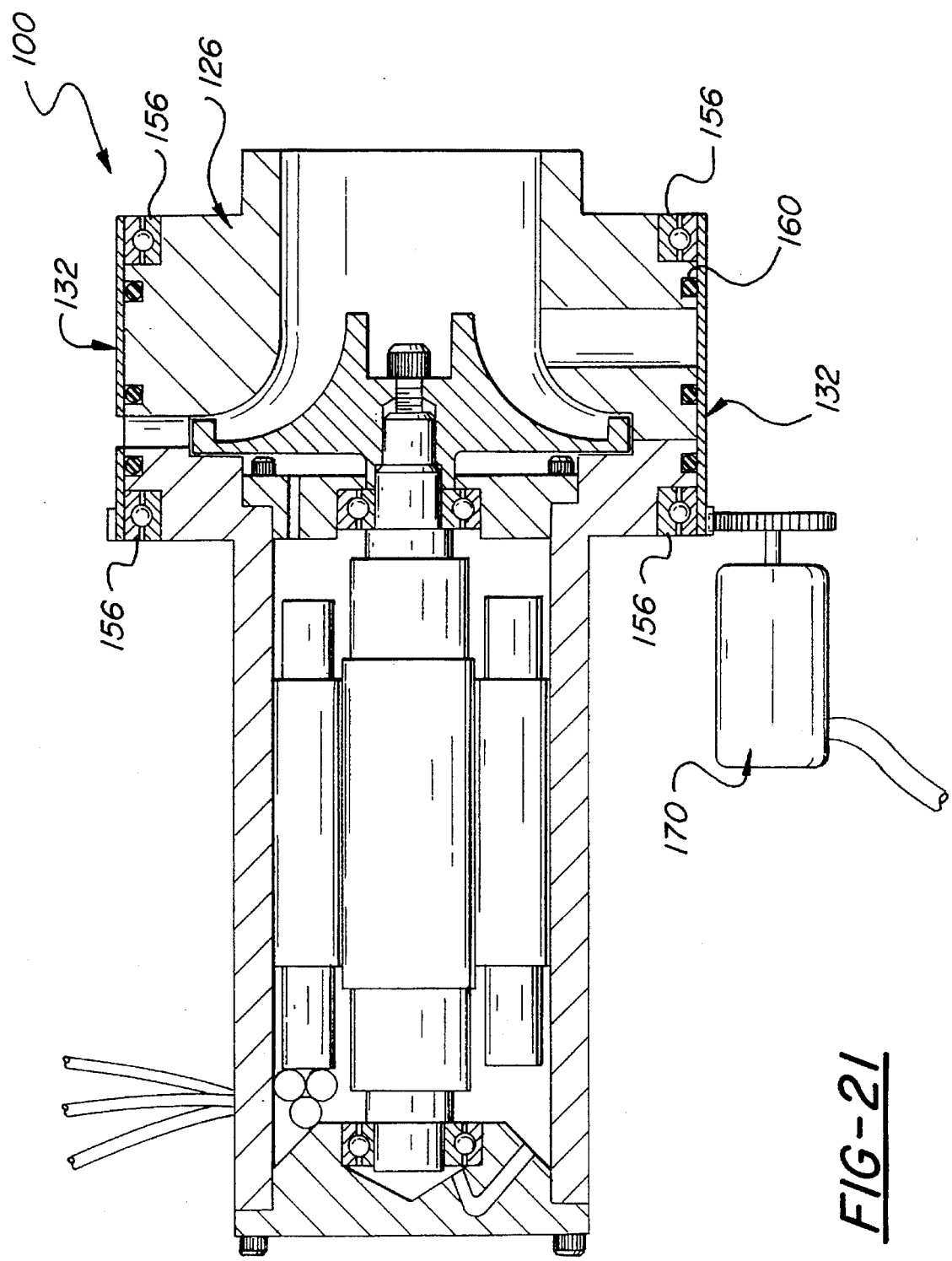
FIG. 21 is a sectional side elevational view of a radial inflow induction air driven alternator assembly including a radial gap alternator therein illustrating a stepper motor drive for actuating the inlet and bypass air control valve.

FIG. 21 illustrates alternator 100 wherein an electrically operated stepper motor actuator assembly 170 is connected to the inlet and bypass air control valve 132. Stepper motor actuator 170 is a bidirectional actuator and is operable to rotate bypass air control valve 132 in both clockwise and counterclockwise directions to control the combustion air intake to the engine intake manifold 108.

Figures 22, 23:
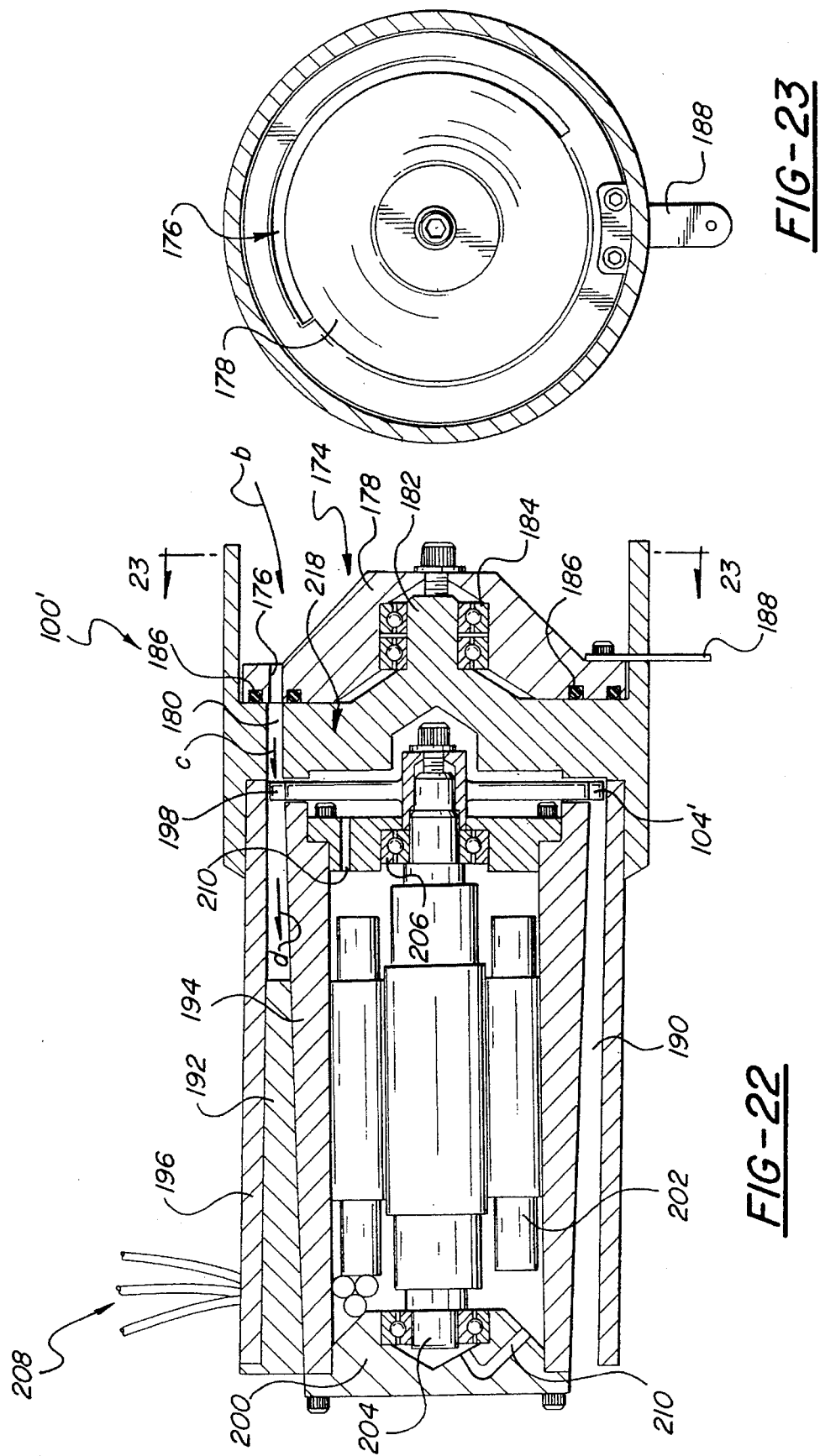
FIG. 22 is a sectional side elevational view of an axial inflow induction air driven alternator assembly constructed in accordance with an alternative embodiment of the invention.
FIG. 23 is a front elevational view of the axial inflow induction air driven alternator of FIG. 22 illustrating an inlet air regulator defined by a moveable nozzle aperture control disc.

In an alternative construction illustrated in FIGS. 22–23, the induction air driven alternator assembly 100' includes an axial turbine assembly 104' for converting the inlet combustion air into rotational motion which drives the alternator 106. Like alternator assembly 100, alternator 100' is mounted on the intake manifold 108 of the port fuel injected engine 102.

With continuing reference to FIGS. 22 and 23, the induction air driven alternator assembly 100' illustrated therein does not include integral turbine bypass structure. Therefore, as illustrated in FIG. 2, separate bypass 112 in parallel flow communication relationship with alternator assembly 100' is also mounted on the engine intake manifold 108. Inlet air b enters the inlet side 174 of the assembly and flows through turbine inlet aperture 176 in the turbine inlet all control plate 178 before entering turbine nozzle flowpath 180. Turbine inlet and control plate 178, illustrated in FIG. 23, is moveable relative to nozzle assembly 218. Movement of the turbine inlet air control plate 178 adjusts the open or exposed area of nozzle assembly and flow of inlet air into intake manifold 108. The turbine inlet air control plate 178 is supported, and rotates on a stationary support shaft 182 which is attached to the nozzle assembly 218 in concert with aperture support bearings 184. Aperture support bearings 184 also maintain the proper clearance and axial relationship between the moveable turbine inlet air control plate 178 and the stationary nozzle assembly 218. O-ring 186 limits unwanted air leakage around the 218 turbine inlet aperture 176 into the turbine nozzle passageway 180. The moveable turbine inlet air control plate 178 is rotated to a selected position for engine 102 operation through mechanical or electro-mechanical input by bellcrank 188.

Figure 38:
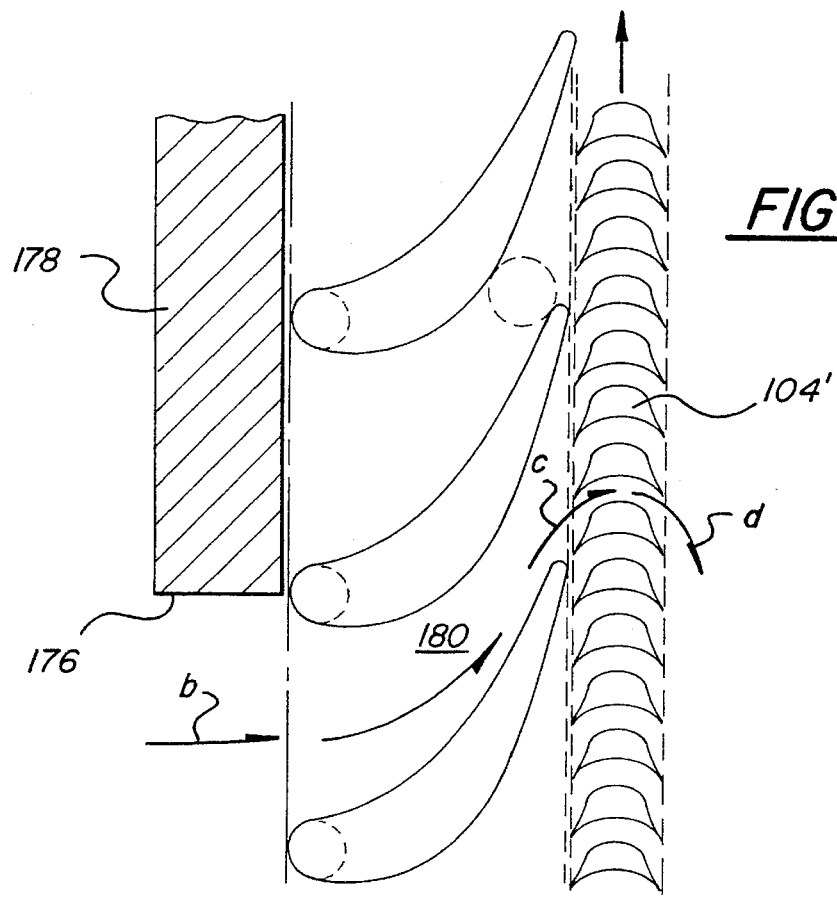
FIG. 38 is a schematic illustration of the turbine nozzle and turbine blades of the axial inflow induction air driven alternator assembly of FIG. 24 illustrating the air flow through the nozzle and blades.

Air flow leaving the nozzle passageway 180 flows through the turbine assembly 104' as shown in FIG. 38 and exits as flow d. Flow d is then communicated through concentric passageway 190, exits alternator assembly 100' and enters into the engine intake manifold 108. Support struts 192 are placed at periodic intervals across concentric pathway 190 in order to support the inner housing 194 relative to the outer support housing 196 and to maintain turbine blade 198 clearance relative to the outer support housing 196.

Contained within the inner housing 194 are bearing supports 200 and alternator stator 202. An alternator shaft 204 is supported and permitted to freely rotate along with the turbine blades 198 by bearings 206. The permanent magnets required for the generation of electrical current are contained with the shaft 204 through conventional means. Electrical current exits the assembly 100" through a wiring harness 208 through appropriate holes drilled within the inner and outer support housings 194,196.

Passageways 210 ensure that no adverse pressure gradients take place across the bearings 206 which would force grease out of the bearings.

FIGS. 24–35 illustrate another induction air driven alternator 100" of the axial turbine type wherein the alternator assembly includes an integral bypass air aperture 212 incorporated into the aperture plate 178'. The operation of alternator 100" is illustrated through four selected operational positions of the combined inlet and bypass air regulator or aperture plate 178'.

FIGS. 24–26 illustrate alternator 100" in an engine idle condition wherein bypass port 214 is occluded and only a small sector of turbine nozzle passageway 180 is exposed for flow. Incoming air b enters the inlet side 174 of the assembly 100" and flows through the turbine inlet aperture 176 in aperture turbine inlet air control plate 178' and into the turbine nozzle assembly 218. Included in the turbine inlet air control plate 178' is bypass air aperture 212. The exposed inlet air flow area of the bypass air aperture 212 is dictated and controlled by the relative location of the moveable turbine inlet air control plate 178' and the stationary bypass port 214.

FIGS. 27–29 illustrate alternator 100" in a partially open throttle condition wherein the turbine inlet air control plate 178' has been rotated 90° clockwise relative to the stationary nozzle assembly 218 to expose a larger sector of turbine nozzle flowpath 180 area. This position is 90° from the idle position of FIG. 24. In this position, the nozzle aperture is open about 50% and the bypass port 214 is restricted.

FIGS. 30–32 also illustrate alternator 100" in a part throttle condition. Herein, the turbine inlet air control plate 178' has been rotated 180° from the idle position of FIG. 24 and all the nozzle assembly admission area is exposed. In this position, the moveable nozzle bypass air aperture 212 is just beginning to expose underlying stationary nozzle bypass port 214 in nozzle assembly 218. Nozzle bypass air f flowing through bypass port 214 merges with the turbine assembly discharge air d in passageway 190 and discharges from the assembly into the engine intake manifold 108.

In FIGS. 33–35, turbine inlet air control plate 178' has been rotated 270° clockwise from the idle position illustrated in FIG. 24. In this full throttle position, the turbine inlet aperture 176 exposes about 50% of the nozzle aperture and the bypass air aperture 212 fully exposes nozzle assembly 216 bypass port 214. Nozzle bypass air f flowing through bypass port 214 merges with the turbine assembly discharge air d in passageway 190 and discharges from the assembly into the engine intake manifold 108. Bypass port 214 is sized such that its total cross sectional area is larger than the full turbine nozzle admission area. FIG. 33 illustrates flowpath f through outer housing 196 and the area where flow f merges with turbine discharge flow d in passageway 190.

FIG. 36 illustrates alternator 100" wherein an electrically operated stepper motor actuator 220 is connected to the combined inlet and bypass air regulator or turbine inlet air control plate 178'. Stepper motor actuator 220 is a bi-directional actuator and is operable to rotate turbine inlet air control plate 178' in both clockwise and counterclockwise directions to control the combustion air intake to the engine intake manifold 108.

Figure 39:
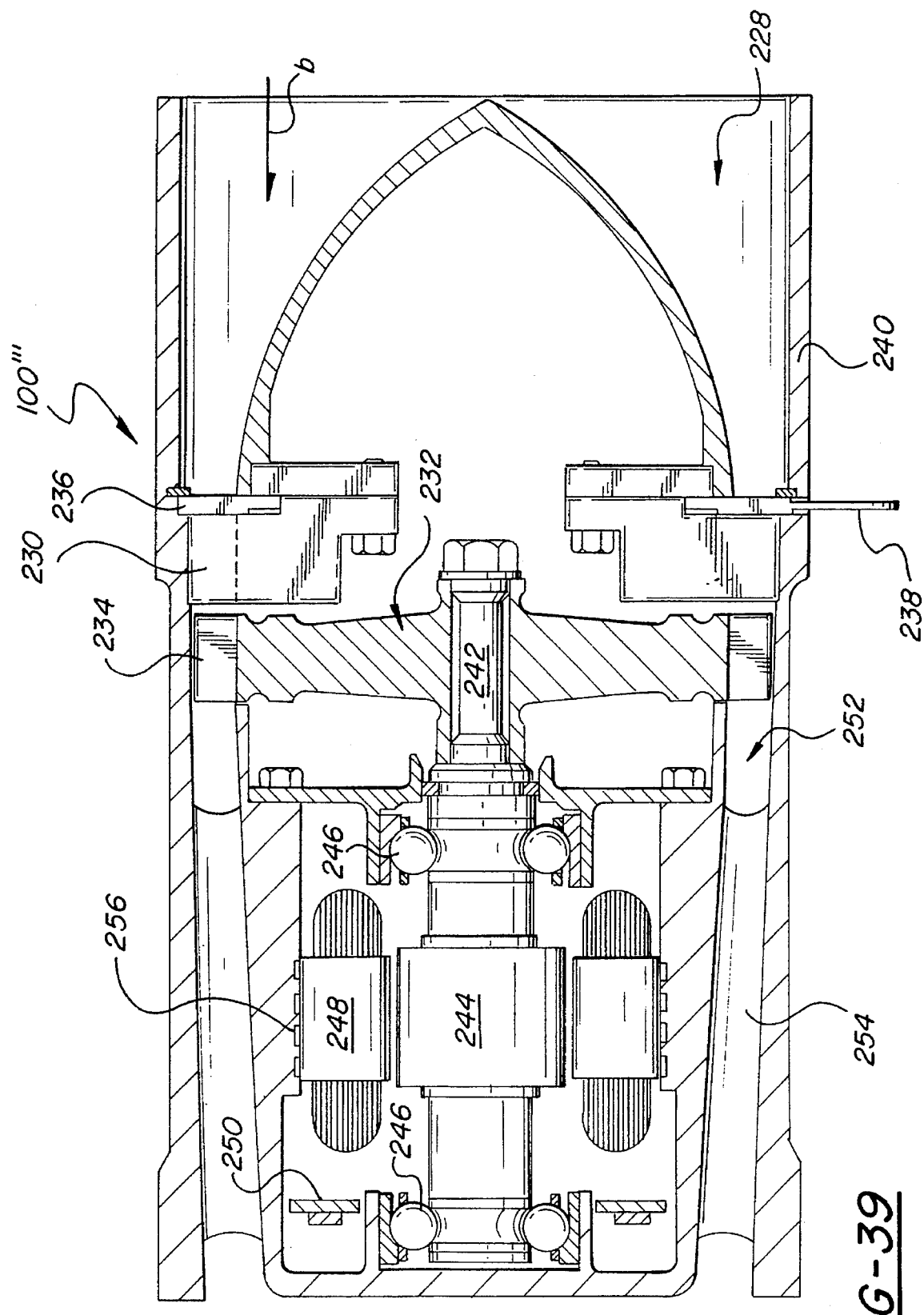
FIG. 39 is a sectional side elevational view of an alternative axial inflow induction air driven alternator assembly illustrating a three phase rectifier assembly mounted internally to the alternator housing.

FIG. 39 illustrates a preferred embodiment of an axial turbine and radial gap type alternator assembly 100''' for interpositioning in the engine air intake. Engine inlet air b enters the assembly through inlet 228. A turbine nozzle 230 turns the air to the proper angle for admittance to the turbine assembly, defined in part by a disc 232 and blade passages 234, and accelerates the flow. Acting in conjunction with an aperture or metering plate 236, throttle cable inputs to lever 238 connected to the aperture plate cause the aperture plate to move in a rotational manner within housing 240. Depending on the angular location of the aperture plate 236, some or all of the turbine inlet nozzles 230 will be eclipsed, causing control of the engine airflow as well as ensuring that maximum kinetic energy is delivered to the turbine assembly disc and blade passages 232,234.

Leaving the turbine nozzle 230 at the optimum angle, the air then enters turbine blade passages 234 where the momentum of the air turning in the turbine blade passages delivers torque to disc 232 which is connected to a shaft 242 and then to a permanent magnet rotor 244. The shaft is supported by bearings 246. Electrical power or current is generated in the alternator stator 248 as shaft 242 is rotated. The current is converted to DC voltage in the rectifier 250, and passed out of the housing 240. Air exiting the turbine is further diffused by virtue of the passage 252 geometry and then exits the assembly 100"'.

The bearings 246 may be grease lubricated ball bearings, or it may be desired to integrate the unit with the host engine oil system. This oil may be squirted into the bearings where the bearings may take the form of either ball or valve bearings. The stator 248 may require additional cooling. This may be accomplished by heat transfer through the housing 240 and then to support fins 254 for dissipation to the alternator discharge air, or the engine oil may be directed around the stator 248 through passages 256 to effect the necessary heat transfer. Oil lubricated bearings of the ball or valve type permit faster design rotational speeds with little sacrifice in bearing life. Faster rotational speeds permit significant reductions in turbine diameter to occur.

Figure 40:
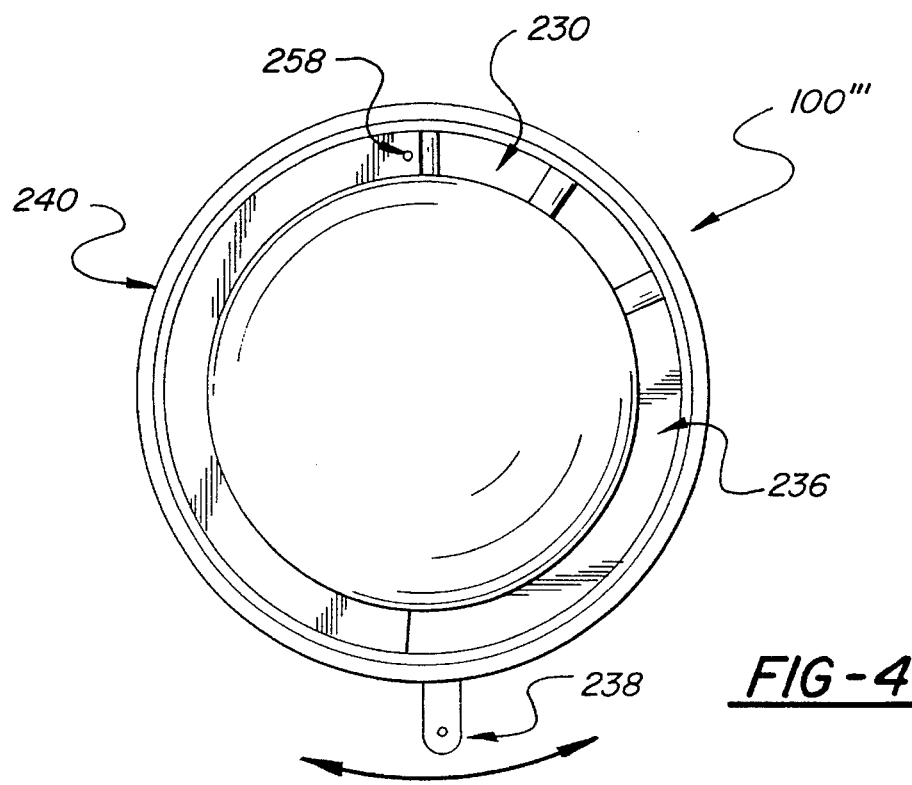
FIG. 40 is a front elevational view of an alternative nozzle arrangement for the axial inflow induction air driven alternator assembly illustrated in FIG. 39 illustrating additional metering ports through a nozzle plate.

If poor engine operation results at either the idle or full power extreme as a result of the inherent metering characteristics of the aperture plate 236, small bleed holes 258 or smaller nozzle aerodynamic passages may be incorporated into the nozzle 230 to achieve a more satisfactory idle engine operation. This construction is shown in FIG. 40. Alternatively, a conventional idle air control valve similar to the General Motors IAC solenoid may be added to bleed idle air around the nozzle 230. Enhanced full power operation may be achieved by integrating a larger external bypass air valve as hereinabove described and shown in FIG. 2, to be opened by the vehicle throttle cable when the aperture plate 236 is fully exposing all turbine nozzles 230 and more engine 102 output power is desired. As herein described, this bypass may take the form of an altogether separate valve assembly, or an integral bypass timed to open as the nozzle reaches full aperture or integral but controlled separately.

Each of the induction air driven alternator assemblies 100,100',100",100''' herein illustrated is a three phase, permanent magnet alternator. These alternators characteristically produce an electrical output which is linearly proportional to rotating speed operating into a constant load. The voltage is also affected as a function of electrical load while the induction air driven alternator 100,100',100",100''' is operated at a constant speed. When the turbine driven alternator is connected to the vehicle battery, the vehicle electrical loads in conjunction with the battery itself serve to load and govern the speed of the turbine. As a result, induction air alternators 100,100',100",100''' are always operating at a speed which will charge the vehicle battery and unload the conventional engine driven alternator.

Induction air driven alternators 100,100',100",100''' always operates at a speed dictated by the bus voltage of the vehicle and the energy available at the turbine. If no energy is available at the turbine, such as at full engine output with minimal pressure drop at the turbine nozzle, the speed of the alternator may drop along with the output voltage. In this circumstance, the battery is blocked from discharging into alternator windings by the rectifier assembly.

Through the application of induction air driven alternators 100,100',100",100''', additional vehicle fuel economy is realized because the alternator is reducing the power output requirements of a conventional engine driven alternator whose efficiency is typically only about 50%. Therefore, the net improvement to fuel economy is not only the power recovered by the alternator but also the additional 50% inefficiency which would have been lost if the engine driven alternator was generating the required power. If in is determined that in a particular vehicle system installation there exists a potential of battery or electrical system damage due to overcharging or high voltage, the three phase rectifier may be replaced with one containing an SCR bridge rectifier assembly thereby allowing alternator output voltage regulation to take place through the use of pulse width modulation techniques. Other alternatives for regulating output power include the use of pulse width modulation techniques to regulate DC terminal voltage through the use of a conventional voltage regulation circuit.

Still another technique would be to turn on ancillary loads in the vehicle to provide satisfactory alternator loads. Some loads, such as a radiator/air conditioning condenser cooling fan could enhance the efficiency of other vehicular systems when utilized.

Still another technique involves bypassing air around the turbine nozzle directly into the engine, to control output power.

On the premise that operating speeds at or below 25,000 RPM are desired to enjoy satisfactory life from the bearings of the alternator, a study was conducted using conventional engine operating data to determine an optimum turbine design. An axial turbine of the partial admission variety was found to be the most satisfactory design to be utilized in the disclosed apparatus. Such a design permits the use of an integral throttling plate to simultaneously govern engine flow and power with the standard automotive throttle hookup while controlling the number of nozzle apertures open to admit flow to the turbine.

In addition, the installation of such a device on the air inlet of an internal combustion engine causes the air temperature to drop across the turbine and nozzle as a result of the near isentropic expansion which takes place. As a result, on a given day, an engine equipped with the induction air driven alternator can develop more power than an engine equipped with a conventional butterfly valve throttle due to the lower engine air inlet temperatures (i.e. higher density air).

With further reference to FIG. 4, the hereinabove described turbine and alternator assemblies 100,100',100"100''' can make good use of recirculated engine exhaust gas and waste heat when the recirculated portion of the exhaust gas is introduced into inlet air intake or throttling system. By introducing recirculated exhaust gas together with the combustion air, additional energy in the form of temperature is available to be converted into electrical current. In addition, through the introduction of recirculated exhaust gas through the inlet air intake, engine charge air inlet temperature exiting the alternator assembly is less than systems where recirculated exhaust gas is introduced downstream of the inlet of the throttling system. A similar effect takes place when air heated by other surplus means is introduced to the inlet air intake.

The energy equation relating the isentropic enthalpy change available for the expansion process in $$\Delta H = Cp \cdot °R \cdot \left(1 - \frac{1}{ER}\right)^{\frac{k-1}{k}}$$

the turbine assembly is:
where:

$\Delta H$=Enthalpy, Btu/lb

Cp=Specific Change Heat, Btu/lb R

R=Inlet Air Temperature, R

ER=Expansion Ratio k=Ratio of Specific Heats

As can be seen, a first order relationship exists between inlet absolute temperature and available specific work. Introduction of recirculated exhaust gas or otherwise heated air with the ambient inlet air raises the inlet temperature to the turbine resulting in a nearly proportional increase in available energy for the turbine. The available energy is only nearly proportional as the specific heat of exhaust gas is slightly lower than that of pure air.

While the best mode for carrying out the invention has been described in detail, those familiar with the art to which this invention relates will recognize various alternative designs and embodiments for practicing the invention as defined by the following claims.

What is claimed is:

1. In combination with a port fuel injected internal combustion engine having an intake manifold for receiving and conducting combustion air to the engine, an induction intake air driven alternator assembly comprising: a turbine assembly and an electrical current generating assembly mounted on the intake manifold and being interposed in the flow of combustion air, the turbine assembly including a partial admission variable area nozzle member having a series of adjacent individual nozzles arranged in an arc and regulator means adjustable to sequentially close completely one or more of said individual nozzles to define in part a variable inlet air intake; said alternator assembly defining an engine power control; said assembly also being operable for converting the change in kinetic energy of the combustion air moving therethrough into electrical energy.

2. The combination of claim 1 wherein said turbine assembly is of an axial configuration.

3. The combination of claim 2 wherein said regulator means is an aperture plate having an inlet air opening therein.

4. The combination of claim 3 wherein said aperture plate also includes a bypass air opening therein.

5. The combination of claim 1 wherein said turbine assembly is of a radial configuration.

6. The combination of claim 5 wherein said regulator means is a control valve having an inlet air opening therein.

7. The combination of claim 6 wherein said control valve also includes a bypass opening therein.

8. The combination of claim 1 wherein said turbine includes an integral intake air bypass, said bypass being controlled by the position of the nozzle aperture.

9. The combination of claim 1 wherein said turbine includes an integral intake air bypass, said bypass being controlled independent of the position of the nozzle aperture.

10. The combination of claim 1 further including an independent external intake air bypass defining in part said variable air intake, said independent bypass being controlled by the position of the nozzle aperture.

11. The combination in claim 1 further including an independent external intake air bypass defining in part said variable air intake, said independent bypass being controlled independent of the position of the nozzle aperture.

12. The combination of claim 1 wherein said electrical current generating assembly is an alternator.

13. The combination of claim 12 wherein said alternator is an axial gap alternator.

14. The combination of claim 12 further including an electrical charging circuit including a battery.

15. The combination of claim 14 further including a rectifier connected to said battery.

16. The combination of claim 12 wherein said alternator includes a plurality of windings and a rotor containing permanent magnets configured such that the range of operating speed generates the required range of output potential to the battery.

17. The combination of claim 12 wherein said alternator includes a three phase rectifier assembly mounted internally of the alternator housing.

18. The combination of claim 1 wherein said internal combustion engine also has an exhaust gas recirculation system for recirculating a portion of the engine exhaust gas into the variable air intake and wherein said recirculated portion of engine exhaust gas is communicated through said turbine whereby the kinetic and potential energy of the recirculated exhaust gas is also converted into electrical energy and whereby the recirculated exhaust gas is cooled as it is communicated through said turbine.

19. A method for converting kinetic and potential energy of inlet combustion air communicated through a variable combustion air intake of a port fuel injected internal combustion engine into electrical energy, the method comprising the steps of:

interposing in the variable combustion air intake a turbine assembly including a partial admission variable area nozzle member having a series of adjacent individual nozzles arranged in an arc and regulator means adjustable to sequentially close completely one or more of said individual nozzles to vary inlet air flow;

conducting the inlet combustion air through the turbine assembly;

adjusting the regulator means to vary inlet air flow;

converting the air movement through the turbine assembly into rotational motion;

communicating the turbine assembly rotational motion to an electrical current generating assembly; and generating electrical current.

20. The method of claim 19 wherein the port fuel injected internal combustion engine also has an exhaust gas recirculation system for recirculating a portion of the engine exhaust gas into the variable combustion air intake, the method further including the step of communicating the portion of recirculating engine exhaust gas through the turbine assembly to further power the turbine.

21. The method of claim 19 wherein the port fuel injected internal combustion engine also has a waste heat recovery system for recovering waste heat from ancillary vehicular components, the method further including the step of communicating the waste heat to the variable combustion air intake to heat the inlet combustion air and provide more energy to the combustion air to power the turbine.

22. The method of claim 19 further including the step of interposing an inlet air bypass in the variable combustion air intake in a parallel flow relationship with the turbine nozzle and aperture.

23. The method of claim 19 further including the steps of supplementing inlet combustion air flow by bypassing the turbine assembly when the turbine assembly is at full capacity and additional air pressure is desired at the engine air intake manifold.

24. The method of claim 23 further including the step of regulating electrical current output in response to air bypass supplementation.

* * * * *